US011907923B2

(12) United States Patent
Long et al.

(10) Patent No.: US 11,907,923 B2
(45) Date of Patent: Feb. 20, 2024

(54) GOLF CLUB HEAD AND METHOD OF MANUFACTURE

(71) Applicant: Taylor Made Golf Company, Inc., Carlsbad, CA (US)

(72) Inventors: D. Clayton Long, Carlsbad, CA (US); Peter Barker, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 179 days.

(21) Appl. No.: 17/516,083

(22) Filed: Nov. 1, 2021

(65) Prior Publication Data

US 2022/0058605 A1 Feb. 24, 2022

Related U.S. Application Data

(63) Continuation of application No. 17/313,345, filed on May 6, 2021, now Pat. No. 11,164,171, which is a (Continued)

(51) Int. Cl.
*A63B 53/04* (2015.01)
*A63B 71/06* (2006.01)
(Continued)

(52) U.S. Cl.
CPC ............. *G06Q 20/18* (2013.01); *A63B 53/04* (2013.01); *A63B 53/047* (2013.01); *A63B 53/0475* (2013.01); *A63B 60/42* (2015.10); *A63B 71/0619* (2013.01); *G01B 5/0023* (2013.01); *G06Q 20/00* (2013.01); *A63B 53/005* (2020.08); *A63B 53/0408* (2020.08);
(Continued)

(58) Field of Classification Search
CPC ... A63B 53/0475; A63B 53/047; A63B 53/04; A63B 2102/32; A63B 2053/0491; A63B 53/005; A63B 53/0408; A63B 53/0433; A63B 53/0437; A63B 53/0445; A63B 71/0619; A63B 60/42; A63B 2225/20; G06Q 20/18; G06Q 20/00; G01B 5/0023
USPC .................................. 473/324–350, 287–292
See application file for complete search history.

(56) References Cited

U.S. PATENT DOCUMENTS 1,536,616 A * 5/1925 Manning ............ A63B 53/0466
473/331
1,598,050 A 8/1926 Butchart
(Continued)

FOREIGN PATENT DOCUMENTS

JP 07222830 8/1995
JP 2007330335 12/2007
(Continued)

*Primary Examiner* — Sebastiano Passaniti
(74) *Attorney, Agent, or Firm* — Dawsey Co., LPA; David J. Dawsey

(57) ABSTRACT

An iron-type golf club having selectively machined portions and attributes, including a machined sole portion and/or a machined leading edge portion. The machined portion(s) include continuous machining scallop lines having a scallop height and a step-over distance. The scallop height is 10-75% of a finished leading edge radius at a vertical midpoint demarcation plane, and the step-over distance is less than 150% of the finished leading edge radius at the vertical midpoint demarcation plane.

20 Claims, 19 Drawing Sheets

Related U.S. Application Data continuation of application No. 16/577,233, filed on Sep. 20, 2019, now Pat. No. 11,004,046, which is a continuation of application No. 15/681,678, filed on Aug. 21, 2017, now Pat. No. 10,423,945.

(60) Provisional application No. 62/441,276, filed on Dec. 31, 2016.

(51) Int. Cl.
*A63B 60/42* (2015.01)
*A63B 102/32* (2015.01)
*A63B 53/00* (2015.01)
*G06Q 20/18* (2012.01)
*G01B 5/00* (2006.01)
*G06Q 20/00* (2012.01)

(52) U.S. Cl.
CPC ....... *A63B 53/0433* (2020.08); *A63B 53/0437* (2020.08); *A63B 53/0445* (2020.08); *A63B 2053/0491* (2013.01); *A63B 2102/32* (2015.10); *A63B 2225/20* (2013.01)

(56) References Cited

U.S. PATENT DOCUMENTS

| | | |
|---|---|---|
| 3,556,532 A | 1/1971 | Ballmer |
| 3,941,390 A | 3/1976 | Hussey |
| 4,206,924 A | 6/1980 | Koralik |
| 4,750,537 A | 6/1988 | Green |
| 4,802,672 A | 2/1989 | Long |
| 4,854,581 A | 8/1989 | Long |
| 4,858,929 A | 8/1989 | Long |
| 4,890,840 A | 1/1990 | Kobayashi |
| 5,143,571 A | 9/1992 | Lacoste et al. |
| 5,272,802 A | 12/1993 | Stites, III |
| 5,273,283 A | 12/1993 | Bowland |
| 5,395,109 A | 3/1995 | Fenton, Jr. |
| 5,429,353 A | 7/1995 | Hoeflich |
| 5,527,034 A | 6/1996 | Ashcraft et al. |
| 5,584,770 A | 12/1996 | Jensen |
| 5,788,584 A | 8/1998 | Parente et al. |
| 6,089,070 A | 7/2000 | Hancock et al. |
| 6,093,112 A | 7/2000 | Peters et al. |
| 6,435,979 B1 * | 8/2002 | Mounfield, Jr. ....... A63B 53/04 473/340 |
| 6,454,664 B1 | 9/2002 | Long |
| 6,508,978 B1 | 1/2003 | Deshmukh |
| 6,511,387 B2 | 1/2003 | Grieb |
| 6,582,322 B2 | 6/2003 | Long |
| 6,685,577 B1 | 2/2004 | Scruggs et al. |
| 6,705,942 B1 | 3/2004 | Crook et al. |
| 6,773,360 B2 | 8/2004 | Willett et al. |
| 7,077,762 B2 | 7/2006 | Kouno et al. |
| 7,153,222 B2 | 12/2006 | Gilbert et al. |
| 7,166,040 B2 | 1/2007 | Hoffman et al. |
| 7,445,564 B2 | 11/2008 | Kusumoto |
| 7,984,559 B2 | 7/2011 | Burns et al. |
| 8,827,836 B2 | 9/2014 | Thomas |
| 8,845,453 B1 * | 9/2014 | Ehlers ................ A63B 60/00 473/343 |
| 9,069,349 B2 | 6/2015 | Pettibone et al. |
| 9,630,071 B2 | 4/2017 | Thomas |
| 10,300,351 B2 | 5/2019 | Greaney et al. |
| 10,423,945 B2 | 9/2019 | Long |
| 10,467,608 B2 | 11/2019 | Beach |
| 10,824,136 B2 | 11/2020 | Souma |
| 10,881,926 B1 | 1/2021 | Hill et al. |
| 11,004,046 B2 | 5/2021 | Long |
| 2002/0016217 A1 | 2/2002 | Takeda et al. |
| 2003/0008731 A1 | 1/2003 | Anderson et al. |
| 2003/0015015 A1 | 1/2003 | Takeda |
| 2004/0087388 A1 | 5/2004 | Beach et al. |
| 2008/0004134 A1 | 1/2008 | Roach et al. |
| 2008/0032812 A1 | 2/2008 | Sorenson |
| 2008/0119303 A1 | 5/2008 | Bennett et al. |
| 2008/0147512 A1 | 6/2008 | Yankton |
| 2009/0325728 A1 * | 12/2009 | Solheim ................ A63B 60/00 473/331 |
| 2010/0056305 A1 | 3/2010 | Hebert et al. |
| 2010/0255929 A1 * | 10/2010 | Soracco ............... G01N 29/045 473/345 |
| 2010/0332005 A1 | 12/2010 | Lemelin et al. |
| 2011/0143857 A1 | 6/2011 | Roach et al. |
| 2012/0252601 A1 | 10/2012 | Thomas |
| 2013/0097050 A1 * | 4/2013 | Soracco ................... B22F 3/11 705/26.5 |
| 2014/0228143 A1 | 8/2014 | Roach et al. |
| 2014/0357399 A1 | 12/2014 | Thomas |
| 2017/0001081 A1 | 1/2017 | Harrington et al. |
| 2018/0018650 A1 | 1/2018 | Gottstein et al. |
| 2019/0060719 A1 | 2/2019 | Greaney et al. |
| 2019/0374822 A1 | 12/2019 | Barker |

FOREIGN PATENT DOCUMENTS

| | | |
|---|---|---|
| JP | 2008149014 | 7/2008 |
| WO | WO 9829163 A1 * | 7/1998 |
| WO | WO0025871 | 5/2000 |

\* cited by examiner

GOLF CLUB HEAD AND METHOD OF MANUFACTURE

CROSS-REFERENCE TO RELATED APPLICATIONS

This application is a continuation of U.S. nonprovisional application Ser. No. 17/313,345, filed on May 6, 2021, now U.S. Pat. No. 11,164,171, which is a continuation of U.S. nonprovisional application Ser. No. 16/577,233, filed on Sep. 20, 2019, now U.S. Pat. No. 11,004,046, which is a continuation of U.S. nonprovisional application Ser. No. 15/681,678, filed on Aug. 21, 2017, now U.S. Pat. No. 10,423,945, which claims the benefit of U.S. provisional patent application Ser. No. 62/441,276, filed on Dec. 31, 2016, all of which are incorporated by reference as if completely written herein. Related applications concerning golf clubs include U.S. patent application Ser. Nos. 14/981,330, 14/843,856, 62/098,707, 62/099,012, 14/719,054, 14/701,962, 14/538,614, 14/632,947, 13/842,545, 14/226,899, 15/012,880, 15/002,471, 15/334,790, 14/330,205, 14/878,131, 14/868,446, 14/658,267, 14/873,477, 15/141,893, which are incorporated by reference herein in their entirety.

FIELD

The present application is directed to embodiments of golf clubs, golf club heads, and methods of manufacturing golf club heads and golf clubs.

BACKGROUND

The performance of golf equipment is continuously advancing due to the development of innovative clubs and club designs. While all clubs in a golfer's bag are important, both scratch and novice golfers rely on the performance and feel of their irons for many commonly encountered playing situations.

Irons are generally configured in a set that includes clubs of varying loft, with shaft lengths and clubhead weights selected to maintain an approximately constant "swing weight" so that the golfer perceives a common "feel" or "balance" in swinging both the low irons and high irons in a set. The size of an iron's "sweet spot" is generally related to the size (i.e., surface area) of the iron's striking face, and iron sets are available with oversize club heads to provide a large sweet spot that is desirable to many golfers.

Conventional "blade" type irons have been largely displaced (especially for novice golfers) by so-called "perimeter weighted" irons, which include "cavity-back" and "hollow" iron designs. Cavity-back irons have a cavity directly behind the striking plate, which permits club head mass to be distributed about the perimeter of the striking plate, and such clubs tend to be more forgiving to off-center hits. Hollow irons have features similar to cavity-back irons, but the cavity is enclosed by a rear wall to form a hollow region behind the striking plate. Perimeter weighted, cavity back, and hollow iron designs permit club designers to redistribute club head mass to achieve intended playing characteristics associated with, for example, placement of club head center of gravity or a moment of inertia.

In addition, even with perimeter weighting, significant portions of the club head mass, such as the mass associated with the hosel, topline, or striking plate, are unavailable for redistribution. The striking plate must withstand repeated strikes both on the driving range and on the course, requiring significant strength for durability.

Golf club manufacturers are consistently attempting to design golf clubs that are easier to hit and offer golfers greater forgiveness when the ball is not struck directly upon the sweet spot of the striking face. As those skilled in the art will certainly appreciate, many designs have been developed and proposed for assisting golfers in learning and mastering the very difficult game of golf.

With regard to iron type club heads, cavity back club heads have been developed. Cavity back golf clubs shift the weight of the club head toward the outer perimeter of the club. By shifting the weight in this manner, the center of gravity of the club head is pushed toward the sole of the club head, thereby providing a club head that is easier to use in striking a golf ball. In addition, weight is shifted to the toe and heel of the club head, which helps to expand the sweet spot and assist the golfer when a ball is struck slightly off center.

Shifting weight to the sole lowers the center of gravity (CG) of the club resulting in a club that launches the ball more easily and with greater backspin. Golf club designers may measure the vertical CG of the golf club relative to the ground when the golf club is soled and in the proper address position, this CG measurement will be referred to as Zup or Z-up or CG Z-up. Decreasing Z-up as opposed to increasing it is preferable. Golf club designers can use a golf club with a low Z-up to design clubs for both low and high handicap golfers by either making a golf club that maintains similar launch angles but increases ball speed and distance or a club that launches the ball more easily in the air. Higher handicap golfers typically have trouble launching the ball in the air so a club that gets the ball in the air more easily is a great benefit. For lower handicap golfers, launching the ball in the air is not typically an issue. For lower handicap golfers, golf club designers may strengthen the loft of the golf club to maintain similar launch conditions and similar amounts of backspin, but resulting in greater ball speed and distance gains of several yards. The result is better golfers may now use one less club when approaching a green, such as, for example, a golfer may now use a 7-iron instead of a 6-iron to hit a green. Placing weight at the toe increases the moment of inertia (MOI) of the golf club resulting in a club that resists twisting and is thereby easier to hit straight even on mishits.

As club manufacturers have learned to assist golfers by shifting the center of gravity toward the sole of the club head, a wide variety of designs have been developed. Unfortunately, many of these designs substantially alter the appearance of the club head while attempting to shift the center of gravity toward the sole and perimeter of the club head. For example, one method of lowering the CG is to simply decrease the face height at the toe and make it closer in height to the face height at the heel of the club resulting in a very untraditional looking club. This is highly undesirable as golfers become familiar with a certain style of club head and alteration of that style often adversely affects their mental outlook when standing above a ball and aligning the club head with the ball. As such, a need exists for an improved club head which achieves the goal of shifting the center of gravity further toward the sole and perimeter of the club head without substantially altering the appearance of a traditional cavity back club head with which golfers have become comfortable. The present invention provides such a club head.

Unfortunately, an additional problem arises from relocating mass on a golf club in that the acoustical properties of the golf club head is often negatively impacted. The acoustical properties of golf club heads, e.g., the sound a golf club head generates upon impact with a golf ball, affect the overall feel of a golf club by providing instant auditory feedback to the user of the club. For example, the auditory feedback can affect the feel of the club by providing an indication as to how well the golf ball was struck by the club, thereby promoting user confidence in the club and himself.

The sound generated by a golf club is based on the rate, or frequency, at which the golf club head vibrates and the duration of the vibration upon impact with the golf ball. Generally, for iron-type golf clubs, a desired first mode frequency is generally around 3,000 Hz and preferably greater than 3,200 Hz. A frequency less than 3,000 Hz may result in negative auditory feedback and thus a golf club with an undesirable feel. Additionally, the duration of the first mode frequency is important because a longer duration results in a ringing sound and/or feel, which feels like a mishit or a shot that is not solid. This results in less confidence for the golfer even on well struck shots. Generally, for iron-type golf clubs, a desired first mode frequency duration is generally less than 10 ms and preferably less than 7 ms.

Accordingly, it would be desirable to reduce the topline weight to shift the CG to the sole and/or toe while maintaining acceptable vibration frequencies and durations. Such a club would be easier to hit because it would launch the ball more easily (low CG) and/or hit the ball straighter even on mishits (increased MOI), and the club would still provide desirable feel through positive auditory feedback. Accordingly, there exists a need for iron-type golf club heads with a strong and lightweight topline.

Golf clubs are typically manufactured with standard lie and loft angles. Some golfers prefer to modify the lie and loft angles of their golf clubs in order to improve the performance and consistency of their golf clubs and thereby improve their own performance.

In some cases, golf club heads, particularly iron-type golf club heads, can be adjusted by being plastically bent in a post-manufacturing process. In such a bending process, it can be difficult to plastically bend the material of the club head in a desired manner without adversely affecting the shape or integrity of the hosel bore, the striking face, or other parts of the club head. In addition, advancements in materials and manufacturing processes, such as extreme heat treatments, have resulted in club heads that are stronger and harder to bend and have more sensitive surface finishes. This increases the difficulty in accurately bending a club head in a desired manner without adversely affecting the club head. Additionally, the iron-type club heads must have a hosel design that will allow for bending. Bending bars are used for bending golf club heads to a golfer's preferred loft and lie. The bending process requires a significant amount of force and/or torque to plastically deform the iron-type club head. It can be difficult to plastically bend the club head in a desired manner without adversely affecting the shape or integrity of the hosel bore, the striking face, or other parts of the club head. As a result the hosel must have significant structural integrity to withstand multiple bending sessions and repeated strikes at the range and the golf course. The risk of club failure makes for a challenging design problem and makes the mass associated with the hosel largely unavailable for redistribution. Accordingly, there exists a need for iron-type golf club heads with strong and lightweight hosels.

Additionally, traditional manufacturing techniques often result in inconsistent curvatures of the finished leading edge, both from head to head as well as across the length of the leading edge of a single club head. Such variabilities may be the result of inconsistencies in casting and forging, but more often they are the result of hand polishing and grinding of the club head during finishing, which often leaves one or more flat areas along the leading edge. Such inconsistencies can be detected by a golfer as they impact how well the leading edge passes through the grass and/or impacts the ground. Hand grinding and polishing during the finishing process essentially establishes the sole contact point, leading edge height, and bounce, whether intentionally or unintentionally. Such hand operations introduce significant variability from one club head to another. A need exists for a golf club head blank having engineered external sacrificial region (s) to be used in conjunction with machining techniques and relationships, such that variability is reduced or removed and the sole contact point, leading edge height, and bounce may be precisely established with respect to one another.

SUMMARY

An iron-type golf club and a method of creating the iron-type golf club including the steps of forming a club head blank having a blank loft, a blank head weight, and an external sacrificial region having an ESR thickness, an ESR sole portion, an ESR face portion, and an ESR leading edge portion. A finished club head is formed having a finished club head weight of less than 310 grams by machining off an ESR removed mass from at least a portion of the external sacrificial region including at least a portion of the ESR sole portion, a portion of the ESR face portion, and a portion of the ESR leading edge portion.

BRIEF DESCRIPTION OF THE DRAWINGS

Without limiting the scope of the present invention as claimed below and referring now to the drawings and figures:

Figure 1:
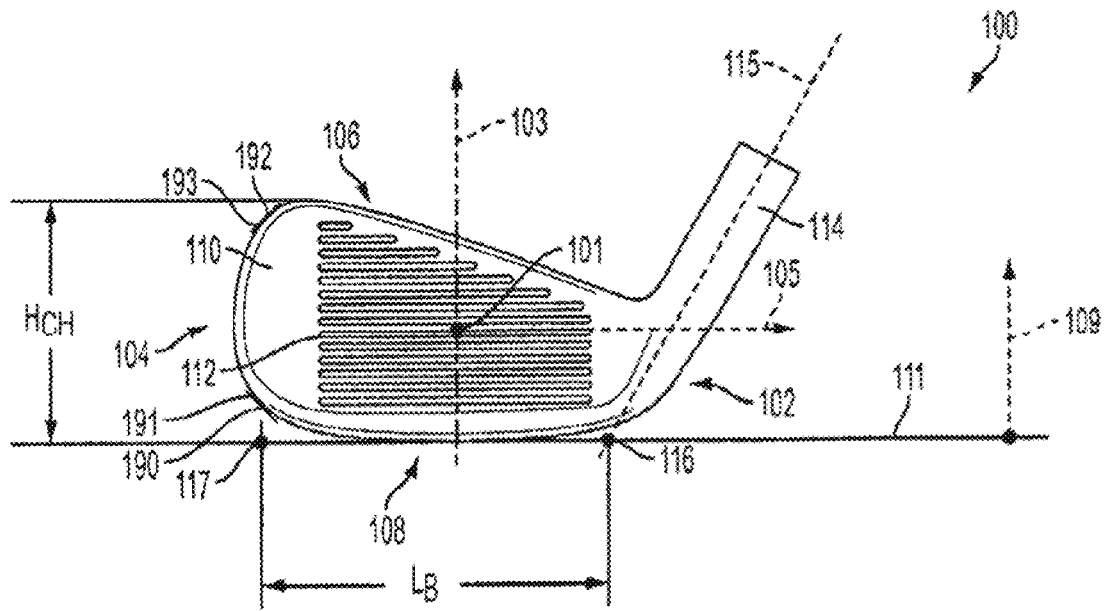
FIG. 1 is a front elevation view of an embodiment of a golf club head.

These drawings are provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION

The inventive features include all novel and non-obvious features disclosed herein both alone and in novel and non-obvious combinations with other elements. As used herein, the phrase "and/or" means "and", "or" and both "and" and "or". As used herein, the singular forms "a," "an," and "the" refer to one or more than one, unless the context clearly dictates otherwise. As used herein, the term "includes" means "comprises." The preferred embodiments of the invention accomplish the stated objectives by new and novel arrangements of elements and configurations, materials, and methods that are configured in unique and novel ways and which demonstrate previously unavailable but preferred and desirable capabilities. The description set forth below in connection with the drawings is intended merely as a description of the presently preferred embodiments of the invention, and is not intended to represent the only form in which the present invention may be constructed or utilized. The description sets forth the designs, materials, functions, means, and methods of implementing the invention in connection with the illustrated embodiments. It is to be understood, however, that the same or equivalent functions, features, and material properties may be accomplished by different embodiments that are also intended to be encompassed within the spirit and scope of the invention. The present disclosure is described with reference to the accompanying drawings with preferred embodiments illustrated and described. The disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout the disclosure and the drawings. In the figures, the thickness of certain lines, layers, components, elements or features may be exaggerated for clarity. All publications, patent applications, patents, and other references mentioned herein are incorporated herein by reference in their entireties. Even though the embodiments of this disclosure are particularly suited as oversized golf club heads and oversized golf clubs and reference is made specifically thereto, it should be immediately apparent that embodiments of the present disclosure are applicable to non-oversized club heads as well.

The following disclosure describes embodiments of golf club heads and methods manufacturing club heads and golf clubs. The disclosure makes reference to the accompanying drawings which form a part hereof, wherein like numerals designate like parts throughout. The drawings illustrate specific embodiments, but other embodiments may be formed and structural changes may be made without departing from the intended scope of this disclosure. Directions and references (e.g., up, down, top, bottom, left, right, rearward, forward, heelward, toeward, etc.) may be used to facilitate discussion of the drawings but are not intended to be limiting. For example, certain terms may be used such as "up," "down,", "upper," "lower," "horizontal," "vertical," "left," "right," and the like. These terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same object. Accordingly, the following detailed description shall not to be construed in a limiting sense and the scope of property rights sought shall be defined by the appended claims and their equivalents.

The present disclosure describes iron type golf club heads typically including a head body and a striking plate. The head body includes a heel portion, a toe portion, a topline portion, a sole portion, and a hosel configured to attach the club head to a shaft. In various embodiments, the head body defines a front opening configured to receive the striking plate at a front rim formed around a periphery of the front opening. In various embodiments, the striking plate is formed integrally (such as by casting or forging) with the head body.

Various embodiments and aspects will be described with reference to details discussed below, and the accompanying drawings will illustrate the various embodiments. The following description and drawings are illustrative and are not to be construed as limiting on the scope of the disclosure. Numerous specific details are described to provide a thorough understanding of various embodiments of the present disclosure. However, in certain instances, well-known or conventional details are not described in order to provide a concise discussion of the various embodiments described herein.

FIG. 1 illustrates an iron type golf club head 100 including a body 113 (FIG. 2) having a heel 102, a toe portion 104, a sole portion 108, a top line portion 106, and a hosel 114. The golf club head 100 is shown in FIG. 1A in a normal address position with the sole portion 108 resting upon a ground plane 111, which is assumed to be perfectly flat. As used herein, "normal address position" means the club head position wherein a vector normal to the center of the club face substantially lies in a first vertical plane (i.e., a vertical plane is perpendicular to the ground plane 111), a centerline axis 115 of the hosel 114 substantially lies in a second vertical plane, and the first vertical plane and the second vertical plane substantially perpendicularly intersect. The center of the club face is determined using the procedures described in the USGA "Procedure for Measuring the Flexibility of a Golf Club head," Revision 2.0, Mar. 25, 2005.

A lower tangent point 190 on the outer surface of the club head 100 of a line 191 forming a 45 degree angle relative to the ground plane 111 defines a demarcation boundary between the sole portion 108 and the toe portion 104. Similarly, an upper tangent point 192 on the outer surface of the club head 100 of a line 193 forming a 45 degree angle relative to the ground plane 111 defines a demarcation boundary between the top line portion 106 and the toe portion 104. In other words, the portion of the club head that is above and to the left (as viewed in FIG. 1) of the lower tangent point 190 and below and to the left (as viewed in FIG. 1) of the upper tangent point 192 is the toe portion 104.

The striking face 110 (FIG. 2) defines a face plane 125 and includes grooves 112 that are designed for impact with the golf ball. It should be noted that, in some embodiments, the toe portion 104 may be understood to be any portion of the golf club head 100 that is toeward of the grooves 112. In some embodiments, the golf club head 100 can be a single unitary cast or forged piece, while in other embodiments, a striking plate can be formed separately to be adhesively, welded, brazed, or mechanically attached to the body 113 (FIG. 2) of the golf club head 100.

Figure 2:
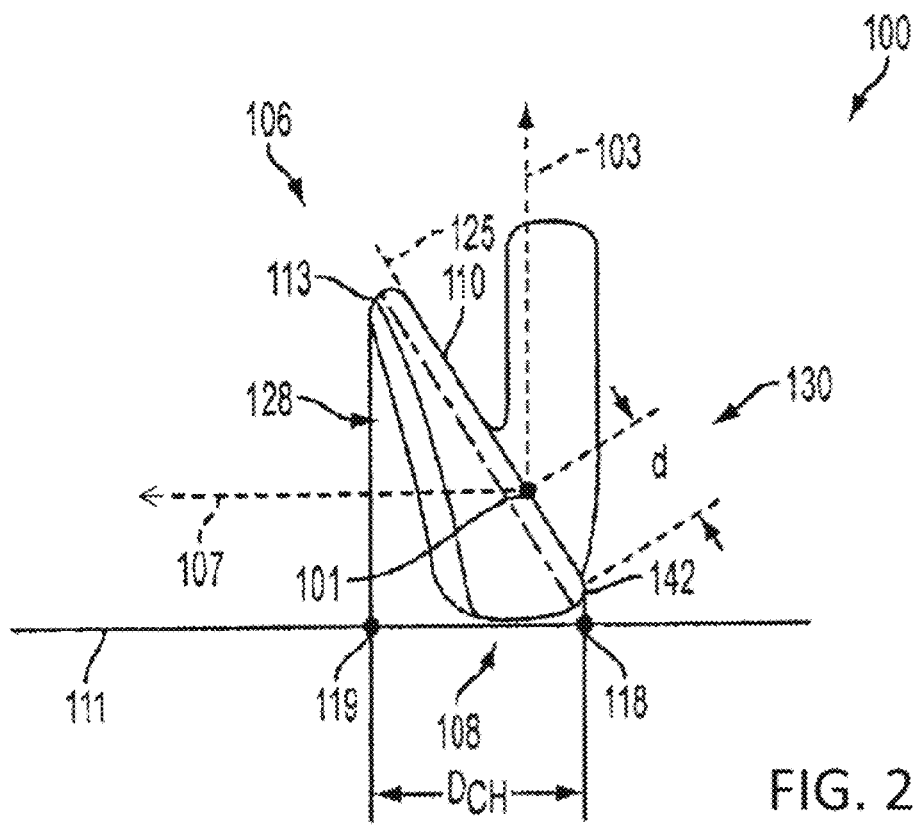
FIG. 2 is a side elevation view of an embodiment of a golf club head.
Figure 3:
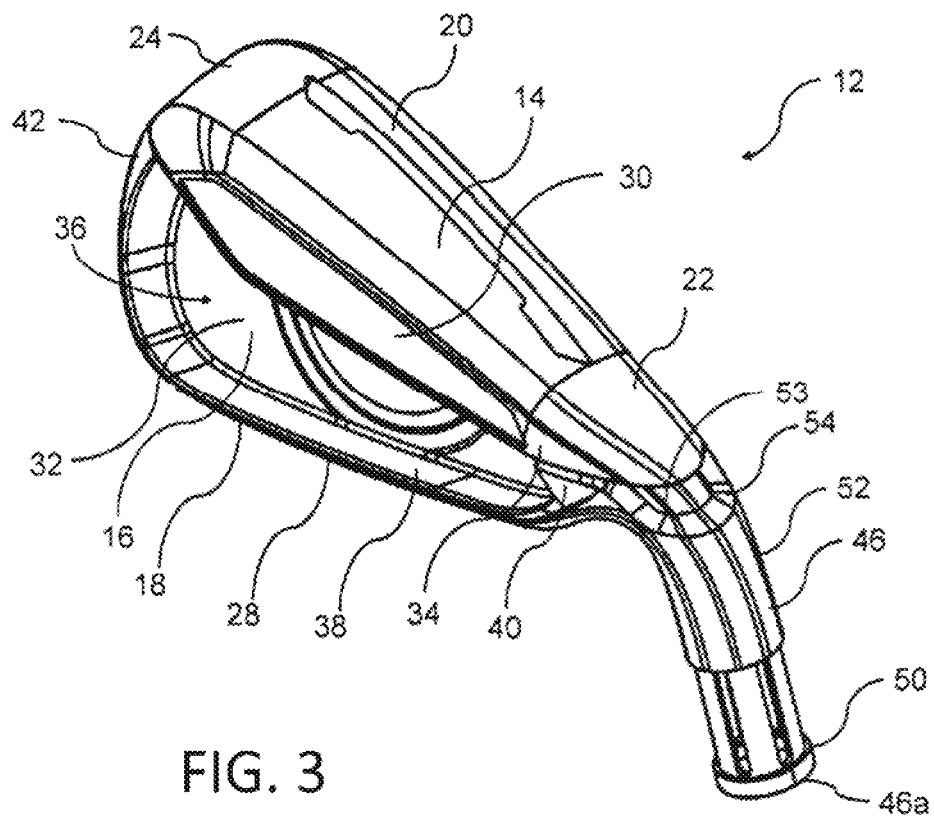
FIG. 3 is a perspective view of an embodiment of a golf club head.
Figure 4:
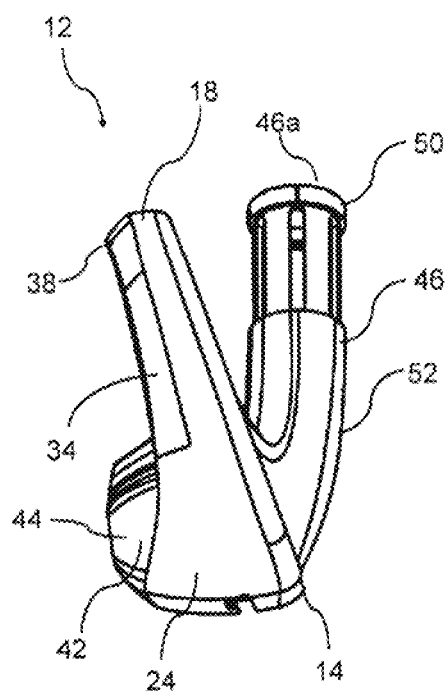
FIG. 4 is a side elevation view of an embodiment of a golf club head.
Figure 5:
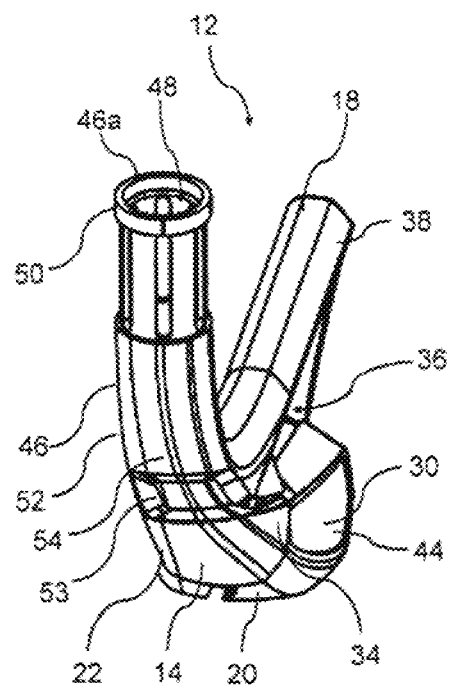
FIG. 5 is a side elevation view of an embodiment of a golf club head.
Figure 6:
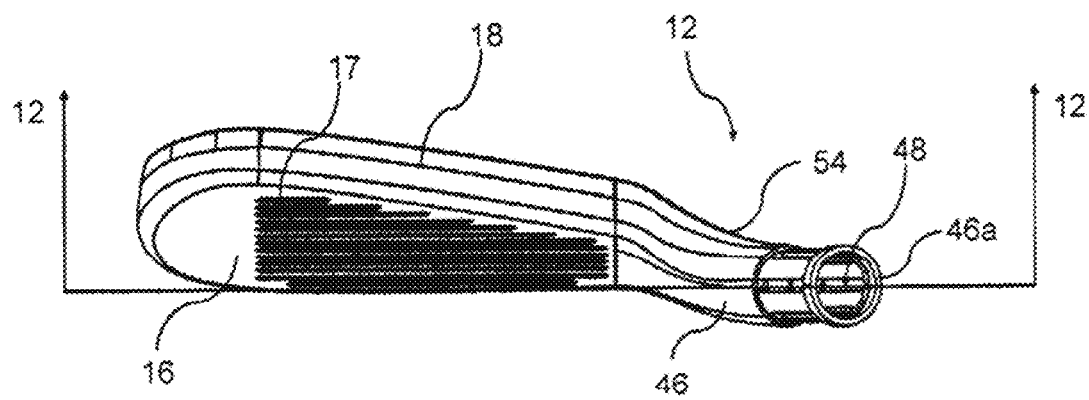
FIG. 6 is a top plan view of an embodiment of a golf club head.
Figure 7:
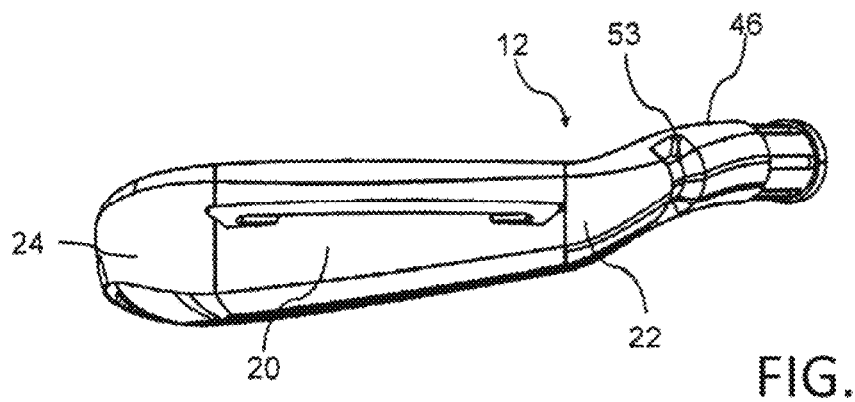
FIG. 7 is a bottom plan view of an embodiment of a golf club head.

FIGS. 1 and 2 also show an ideal striking location 101 on the striking face 110 and respective orthogonal CG axes. As used herein, the ideal striking location 101 is located within the face plane 125 and coincides with the location of the center of gravity (CG) of the golf club head along the CG x-axis 105 (i.e., CG-x) and is offset from the leading edge 142 (defined as the midpoint of a radius connecting the sole portion 108 and the face plane 125) by a distance d of 16.5 mm within the face plane 125, as shown in FIG. 1B. A CG x-axis 105, CG y-axis 107, and CG z-axis 103 intersect at the ideal striking location 101, which defines the origin of the orthogonal CG axes. With the golf club head 100 in the normal address position, the CG x-axis 105 is parallel to the ground plane 111 and is oriented perpendicular to a normal extending from the striking face 110 at the ideal striking location 101. The CG y-axis 107 is also parallel to the ground plane and is perpendicular to the CG x-axis 105. The CG z-axis 103 is oriented perpendicular to the ground plane. In addition, a CG z-up axis 109 is defined as an axis perpendicular to the ground plane 111 and having an origin at the ground plane 111. In certain embodiments, a desirable CG-y location is between about 0.25 mm to about 20 mm along the CG y-axis 107 toward the rear portion of the club head. Additionally, in another embodiment a desirable CG-z location is between about 12 mm to about 25 mm along the CG z-up axis 109, as previously described. The golf club head may be of solid (also referred to as "blades" and/or "musclebacks"), hollow, cavity back, or other construction.

In the embodiments shown in FIGS. 1-2, the grooves 112 are located on the striking face 110 such that they are centered along the CG x-axis about the ideal striking location 101, i.e., such that the ideal striking location 101 is located within the striking face plane 125 on an imaginary line that is both perpendicular to and that passes through the midpoint of the longest score-line groove 112. In other embodiments (not shown in the drawings), the grooves 112 may be shifted along the CG x-axis to the toe side or the heel side relative to the ideal striking location 101, the grooves 112 may be aligned along an axis that is not parallel to the ground plane 111, the grooves 112 may have discontinuities along their lengths, or the grooves may not be present at all. Still other shapes, alignments, and/or orientations of grooves 112 on the surface of the striking face 110 are also possible.

In reference to FIG. 1, the club head 100 has a sole length, $L_B$, and a club head height, $H_{CH}$. The sole length, $L_B$, is defined as the distance between two points projected onto the ground plane 111. A heel side 116 of the sole is defined as the intersection of a projection of the hosel axis 115 onto the ground plane 111. A toe side 117 of the sole is defined as the intersection point of the vertical projection of the lower tangent point 190 (described above) onto the ground plane 111. The distance between the heel side 116 and toe side 117 of the sole is the sole length $L_B$ of the club head. The club head height, $H_{CH}$, is defined as the distance between the ground plane 111 and the uppermost point of the club head as projected in the x-z plane, as illustrated in FIG. 1.

FIG. 2 illustrates an elevated toe view of the golf club head 100 including a back portion 128, a front portion 130, a sole portion 108, a top line portion 106, and a striking face 110, as previously described. A leading edge 142 is defined by the midpoint of a radius connecting the face plane 125 and the sole portion 108, within a vertical front-to-rear plane is perpendicular to the vertical shaft axis plane, as will be defined later in more detail. The club head includes a club head front-to-back depth, $D_{CH}$, which is the distance between two points projected onto the ground plane 111. A forward end 118 of the club head is defined as the intersection of the projection of the leading edge 142 onto the ground plane 111. A rearward end 119 of the club head is defined as the intersection of the projection of the rearwardmost point of the club head (as viewed in the y-z plane) onto the ground plane 111. The distance between the forward end 118 and rearward end 119 of the club head is the club head depth $D_{CH}$.

In some embodiments, the volume of the hollow iron club head 100 may be between about 10 cubic centimeters (cc) and about 120 cc. For example, in some embodiments, the iron club head 100 may have a volume between about 20 cc and about 110 cc, such as between about 30 cc and about 100 cc, such as between about 40 cc and about 90 cc, such as between about 50 cc and about 80 cc, or such as between about 60 cc and about 80 cc. In addition, in some embodiments, the iron club head 100 has a club head depth, $D_{CH}$, that is between about 15 mm and about 100 mm. For example, in some embodiments, the iron club head 100 may have a club head depth, $D_{CH}$, of between about 20 mm and about 90 mm, such as between about 30 mm and about 80 mm, such as between about 40 mm and about 70 mm.

In certain embodiments of the golf club head 100 that include a separate striking plate attached to the body 113 of the golf club head, the striking plate can be formed of forged maraging steel, maraging stainless steel, precipitation-hardened (PH) stainless steel, titanium alloys, or even non-metallic materials. In general, maraging steels have high strength, toughness, and malleability. Being low in carbon, they derive their strength from precipitation of inter-metallic substances other than carbon. The principle alloying element is nickel (15% to nearly 30%). Other alloying elements producing inter-metallic precipitates in these steels include cobalt, molybdenum, and titanium. In one embodiment, the maraging steel contains 18% nickel. Maraging stainless steels have less nickel than maraging steels but include significant chromium to inhibit rust. The chromium augments hardenability despite the reduced nickel content, which ensures the steel can transform to martensite when appropriately heat-treated. In another embodiment, a maraging stainless steel C455 is utilized as the striking plate. In other embodiments, the striking plate is a precipitation hardened stainless steel such as 17-4, 15-5, or 17-7.

The striking plate may be forged by hot press forging using any of the described materials in a progressive series of dies. After forging, the striking plate may be subjected to heat-treatment. For example, 17-4 PH stainless steel forgings are heat treated by 1040° C. for 90 minutes and then solution quenched. In another example, C455 or C450 stainless steel forgings are solution heat-treated at 830° C. for 90 minutes and then quenched.

In some embodiments, the body 113 of the golf club head is made from 17-4 steel. However another material such as carbon steel (e.g., 1020, 1030, 8620, or 1040 carbon steel), chrome-molybdenum steel (e.g., 4140 Cr—Mo steel), Ni—Cr—Mo steel (e.g., 8620 Ni—Cr—Mo steel), austenitic stainless steel (e.g., 304, N50, N60 stainless steel (e.g., 410 stainless steel), titanium alloys, or non-metallic materials can be used.

In addition to those noted above, some examples of metals and metal alloys that can be used to form the components of the parts described include, without limitation: titanium alloys (e.g., 3-2.5, 6-4, SP700, 15-3-3-3, 10-2-3, or other alpha/near alpha, alpha-beta, and beta/near beta titanium alloys), aluminum/aluminum alloys (e.g., 3000 series alloys, 5000 series alloys, 6000 series alloys, such as 6061-T6, and 7000 series alloys, such as 7075), magnesium alloys, copper alloys, and nickel alloys.

In still other embodiments, the body 113 and/or striking plate of the golf club head are made from fiber-reinforced polymeric composite materials, and are not required to be homogeneous. Examples of composite materials and golf club components comprising composite materials are described in U.S. Patent Application Publication No. 2011/0275451, which is incorporated herein by reference in its entirety.

The body 113 of the golf club head can include various features such as weighting elements, cartridges, and/or inserts or applied bodies as used for CG placement, vibration control or damping, or acoustic control or damping. For example, U.S. Pat. No. 6,811,496, incorporated herein by reference in its entirety, discloses the attachment of mass altering pins or cartridge weighting elements.

In further embodiments the club head 100 may incorporate any of the "Iron Type Golf Club Heads Having a Flexible Boundary Structures" described in U.S. patent application Ser. No. 14/981,330, which is incorporated herein by reference in its entirety.

Turning to FIGS. 3-20, an iron-type golf club head 12 includes a club head body 14 having a striking face 16 with a plurality of scorelines 17, a top line 18 defining the upper limit of the striking face 16, a sole portion 20 defining the lower limit of the striking face 16, a heel portion 22, a toe portion 24 and a rear surface opposite the striking face 16. In some embodiments the rear surface 26 may have a cavity back construction and includes an upper section 28 adjacent the top line 18, a lower section 30 adjacent the sole portion 20 and a middle section 32 between the upper section 28 and the lower section 30.

In some embodiments the iron-type golf club head 12 has the general configuration of a cavity back club head and, consequently, the rear surface 26 includes a flange 34 extending rearwardly around the periphery of the club head body 14. The rearwardly extending flange 34 defines a cavity 36 within the rear surface 26 of the club head body 14. The flange 34 includes a top flange 38 extending rearwardly along the top line 18 of the club head body 14 adjacent the upper section 28. The top flange 38 extends the length of the top line 18 from the heel portion 22 of the club head body 14 to the toe portion 24 of the club head body 14. The club head body 14 is further provided with rearwardly extending flanges 40, 42 along the heel portion 22 (that is, a heel flange 40) and the toe portion 24 (that is, a toe flange 42) of the club head body 14. These rearwardly extending flanges 38, 40, 42 extend through the upper section 28, lower section 30 and middle section 32 of the rear surface 26 of the iron-type golf club head 12. Additionally, the club head body 14 is provided with a bottom flange 44 extending along the sole portion 20 of the club head body 14. In some embodiments iron-type golf club head 12 is preferably cast from suitable metal such as stainless steel. Although shown as a cavity-back iron, the iron-type golf club head 12 could be a "muscle back, or "blade," construction, or even a "hollow" iron-type club and may be any iron-type club head from a one-iron to a wedge.

The iron type golf club head 12 further includes a hosel 46. The hosel 46 has a hosel top edge 46a, a hosel bore 48, a hosel outer diameter top 50, and a hosel outer diameter bottom 52 (if the hosel is tapered). The hosel bore 48 includes a proximal end 48a and a distal end 48b. The proximal end 48a of the hosel bore 48 is proximate the hosel top edge 46a. Proximate the distal end 48b of the hosel bore 48 is a weight cartridge port or simply a cartridge port 49 (See FIG. 12). The cartridge port 49 has a proximal end 49a and a distal end 49b. The hosel 46 further includes a neck 54 connected to the heel portion 22 of the body 14.

In some embodiments the hosel bore 48 ranges from about 8-12 mm, such as about 9.0 mm to about 9.6 mm. The hosel outer diameter top 50 ranges from about 12-15 mm, such as about 13.0 mm to about 13.6 mm. The hosel outer diameter bottom 52 ranges from about 12-17 mm, such as about 13.0 mm to about 13.6 mm.

The cartridge port 49 allows for addition of a weight adjustment member (not shown) having a shape and size similar to the cartridge port 49, which may optionally be used to adjust the swing weight of the iron type golf club. This may help with overcoming manufacturing tolerances or adjusting the iron type club to a player's preferred swing weight. The weight adjustment member may be formed of metal or plastic. Since the weight adjustment member is located near the center of gravity of the iron type club head 12, the club head center of gravity will not change significantly when selecting any of the plurality of weight adjustment members.

Figure 8:
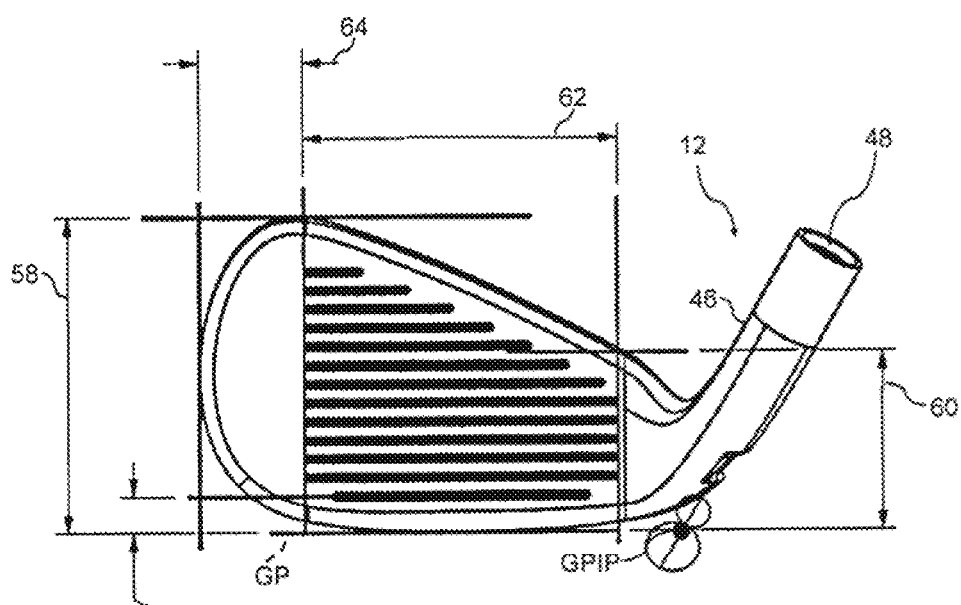
FIG. 8 is a rotated front elevation view of an embodiment of a golf club head so that the face is in a vertical plane.
Figure 9:
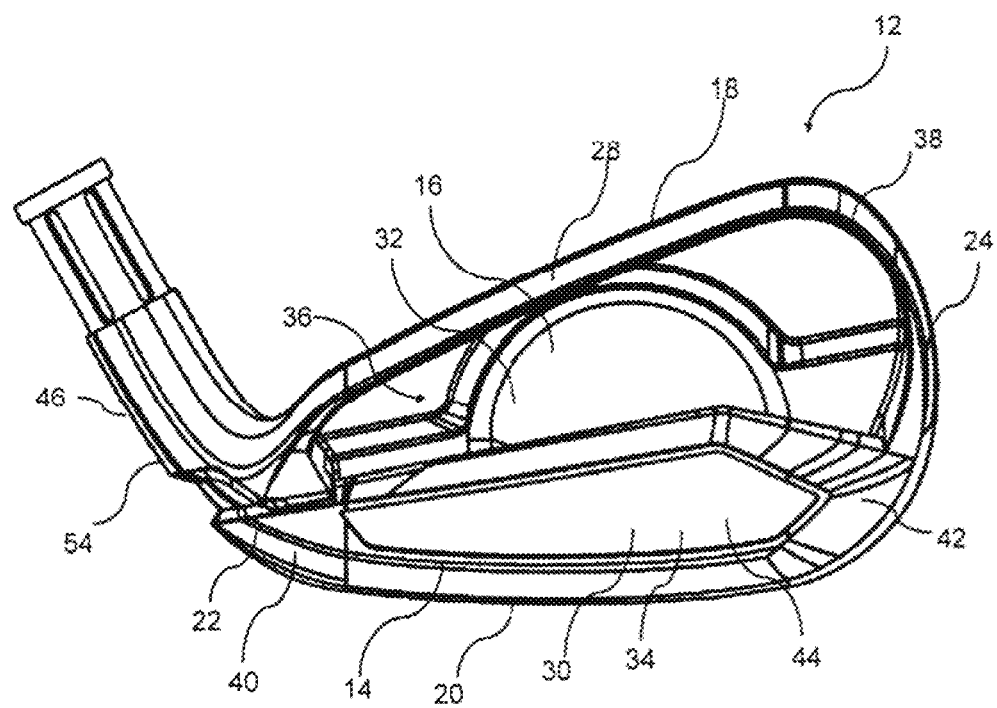
FIG. 9 is a rear elevation view of an embodiment of a golf club head.
Figure 14:
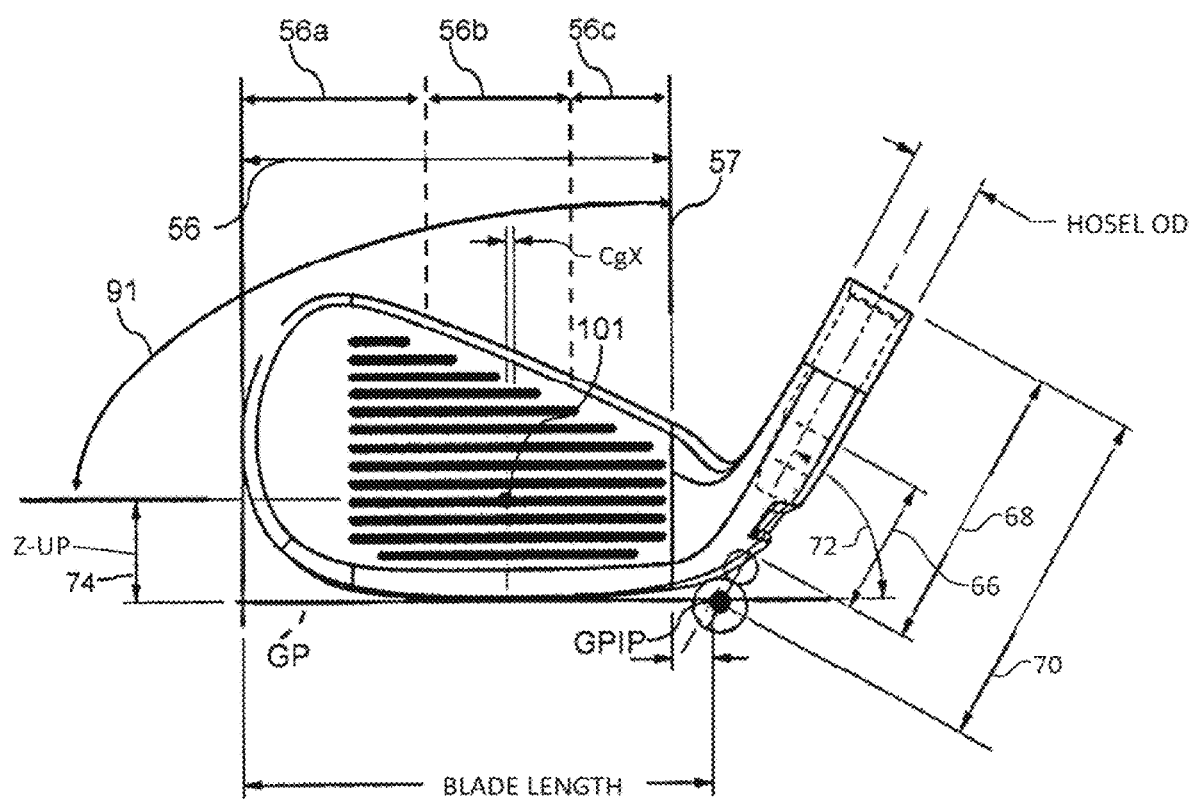
FIG. 14 is a front elevation view of an embodiment of a golf club head.

Turning to FIGS. 8 and 14, the iron type golf club head 12 includes a face length 56, a par line 57, a toe face height 58, a heel face height 60, a scoreline length 62, and a toe-to-end-of-scorelines length 64. The par line 57 is at the transition point between the flat striking face 16 and the organically shaped region that attaches the club head body 14 to the hosel 46. The scorelines 17 end just before the par line 57. The face length 56 extends from the par line 57 to toe portion 24 of the iron type golf club head 12. As shown the toe face height 58 and the heel face height 60 sandwich the scorelines. Accordingly, the toe face height 58 is measured proximate the scorelines 17 near the toe portion 24, and the heel face height 60 is measured proximate the scorelines 17 near the heel portion 22. In some embodiments the toe face height 58 is at least 35 mm, such as at least 40 mm, such as at least 45 mm, such as at least 50 mm, or such as at least 60 mm. The heel face height 60 ranges from about 20-60 mm, such as about 25-45 mm, such as about 25-40 mm, or such as about 25-35 mm. The a toe-to-end-of-scorelines length 64 is the maximum distance measuring from the scorelines to the toe portion 24, and in some embodiments the a toe-to-end-of-scorelines length 64 is at least 5 mm, such as at least 10 mm, or such as at least 15 mm. The scorelines length 62 is the maximum length of the scorelines, and the scorelines length 62 is at least 40 mm, such as at least 45 mm, such as at least 50 mm, or such as at least 60 mm.

Figure 10:
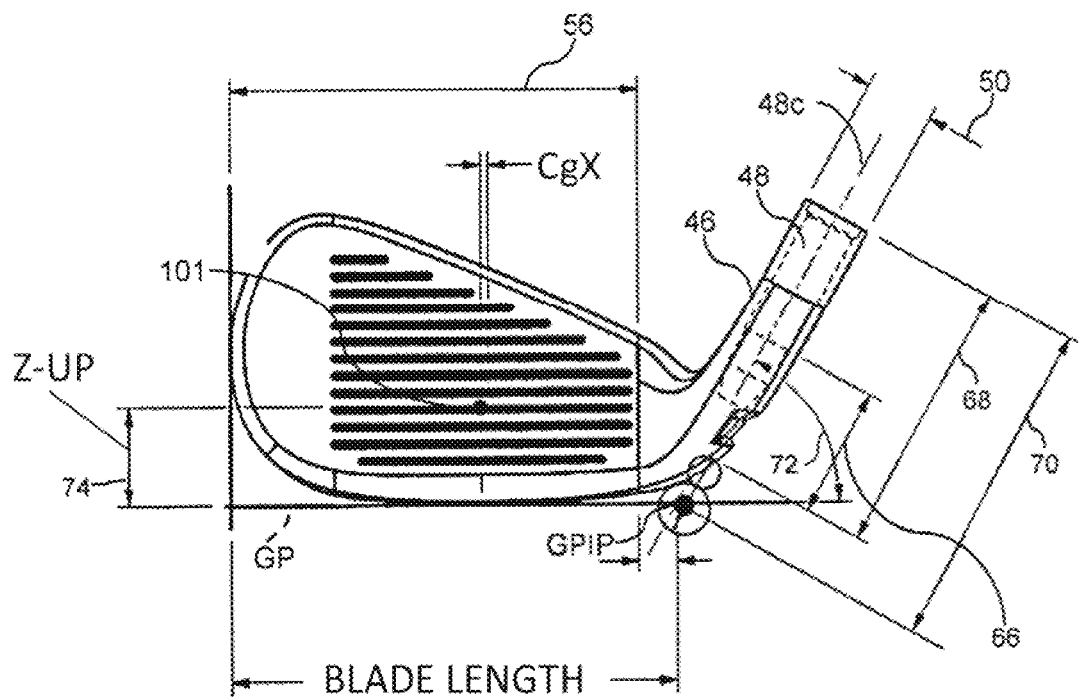
FIG. 10 is a front elevation view of an embodiment of a golf club head.
Figure 11:
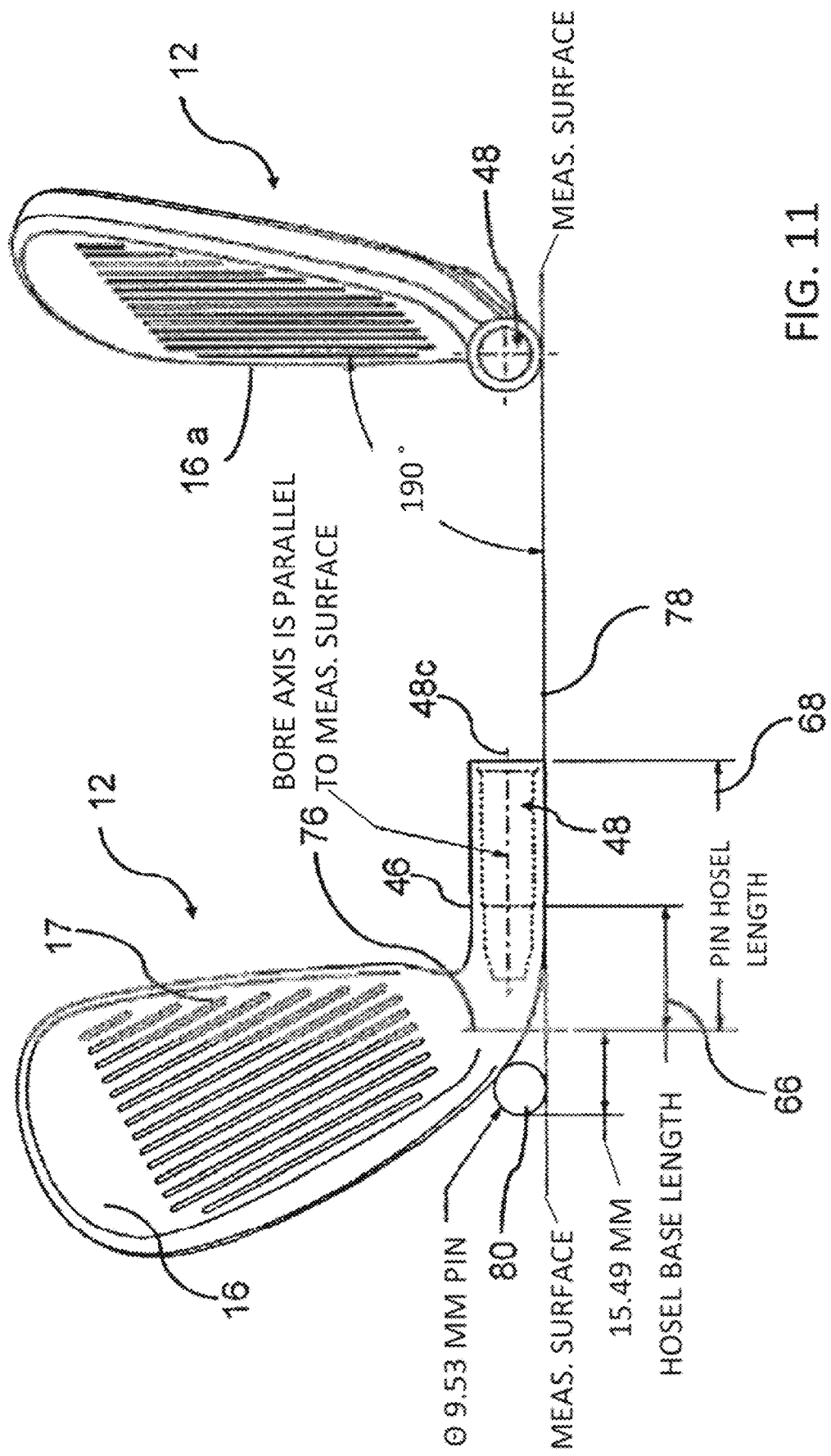
FIG. 11 is an elevation view of an embodiment of a golf club head in a measurement configuration.
Figure 12:
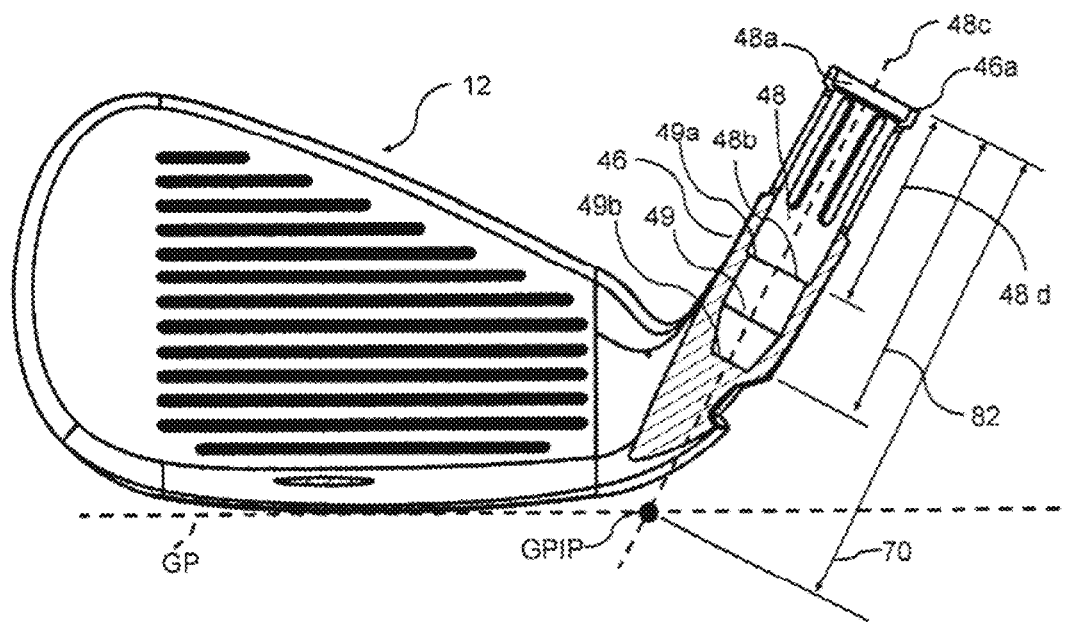
FIG. 12 is a partial cross-sectional view of an embodiment of a golf club head.
Figure 13:
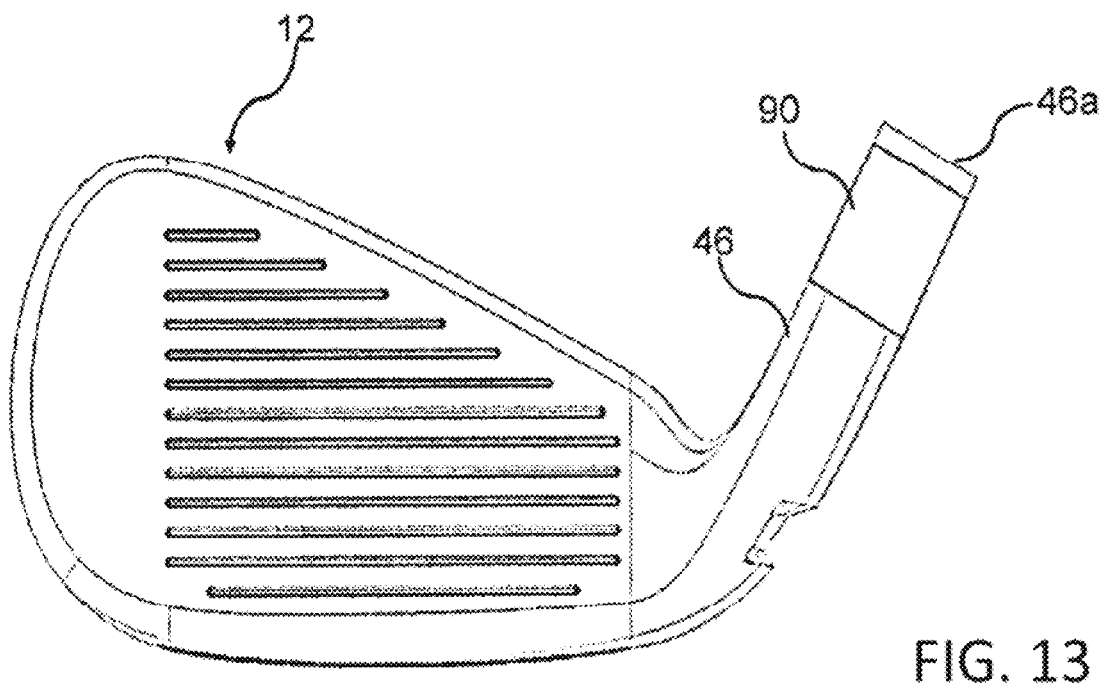
FIG. 13 is a front elevation view of an embodiment of a golf club head.

Turning to FIGS. 10 and 11, the iron type golf club head 12 may include a base hosel length 66, a pin hosel length 68, a hosel length 70, a lie angle 72, and a Z-up 74. In some embodiments, the hosel bore 46 may be generally symmetric about a longitudinal hosel bore axis 48 c. As shown, the hosel bore axis 48c is at an angle relative to a ground plane (GP), and this angle is commonly referred to as a lie angle 72 of the club head. The ground plane is the plane onto which the iron type golf club head 12 may be properly soled i.e. arranged so that the sole portion 20 is in contact with the GP. The intersection of the ground plane and the hosel bore axis 48c creates a ground plane intersection point (GPIP). The GPIP may be used to measure or reference features of the iron type golf club head 12.

The hosel length 70 is measured from the GPIP to hosel top edge 46a along the hosel bore axis 48c. A hosel bore length 48d is measured from the hosel top edge 46a along the hosel bore axis 48c to the hosel bore distal end 48b. For reference and as shown in FIG. 11, a hosel measurement datum 76 is used for making the base hosel length and the pin hosel length measurements 66, 68. The hosel measurement datum 76 is created by first placing the iron type golf club head 12 on a generally planar measurement surface 78, second the hosel bore axis 48 c is aligned parallel to the measurement surface 78 and the heel portion 22 of the iron type golf club head 12 is pressed against a pin 80 having a 0.375 inch diameter, next the hosel measurement datum 76 is created perpendicular to the measurement surface and offset 15.49 mm from a plane tangent to a distal end of the pin and perpendicular to the measurement surface. Additionally, as shown a leading edge 16a of the striking face 16 is aligned at 90 degrees relative to the measurement surface 78.

The base hosel length 66 is measured parallel to the measurement surface from the hosel measurement datum 76 to the distal end 48b of the hosel bore 48. The pin hosel length 68 is measured parallel to the measurement surface 78 from the hosel measurement datum 76 to the hosel top edge 46a. Generally, the hosel bore axis 48c passes through the center of the hosel. The hosel bore axis can be found by inserting a cylindrically shaped pin or dowel having a diameter substantially similar to the hosel bore in the hosel bore. The axis of the pin or dowel should be substantially aligned with the hosel bore axis. If the hosel bore is tapered then the pin or dowel should have a substantially similar taper to determine the hosel bore axis. Another method of determining the hosel bore axis would be to measure the diameter of the hosel bore at two or more locations along the hosel bore and then construct an axis through the center points of the two or more diameters measured.

In an embodiment the base hosel length 66 is at least 15 mm, such as at least 20 mm, such as at least 25 mm, such as at least 30 mm, or such as at least 35 mm. Typically in a lower lofted iron (e.g. 17 degrees to 48 degrees) the base hosel length may range from about 20 mm to about 30 mm. For wedges 50 degrees and greater, such as gap wedge, sand wedge, and lob wedge, the base hosel length is generally at least 40 mm.

In an embodiment the pin hosel length 68 is at least 40 mm, such as at least 45 mm, such as at least 50 mm, such as at least 55 mm, such as at least 60 mm, such as at least 65 mm, such as at least 70 mm, or such as at least 75 mm. Although, this measurement may vary, generally the pin hosel length will be about 23 mm to about 33 mm greater than the base hosel length, or preferably about 25 mm to about 28 mm. Typically in a lower lofted iron e.g. 17 degrees to 48 degrees the pin hosel length may range from about 45 mm to about 60 mm, or preferably about 50 mm to about 60 mm. For wedges 50 degrees and greater, such as gap wedge, sand wedge, and lob wedge, the base hosel length is generally at least 40 mm. In an embodiment the hosel length 70 is at least 40 mm, such as at least 45 mm, such as at least 50 mm, such as at least 55 mm, such as at least 60 mm, such as at least 65 mm, such as at least 70 mm, such as at least 75 mm, such as at least 80 mm, such as at least 85 mm, such as at least 90 mm, or such as at least 95 mm.

The portion of the shaft that bonds to the hosel bore of the iron type golf club head is referred to as the bond length. In many instances, the bond length is the same as the hosel bore length 48d, however in some instances there is a difference of about 1 mm to about 4 mm between the bond length and the hosel bore length. This is because a ferrule may be used that snaps into the hosel bore, which requires about 1 mm to about 4 mm for engagement. The bond length is generally about 20 mm to about 35 mm, preferably about 25 mm to about 30 mm. The bond length may also be approximated by finding the difference between the pin hosel length 68 and the base hosel length 66, which is typically between about 25 mm to about 30 mm.

Figure 15:
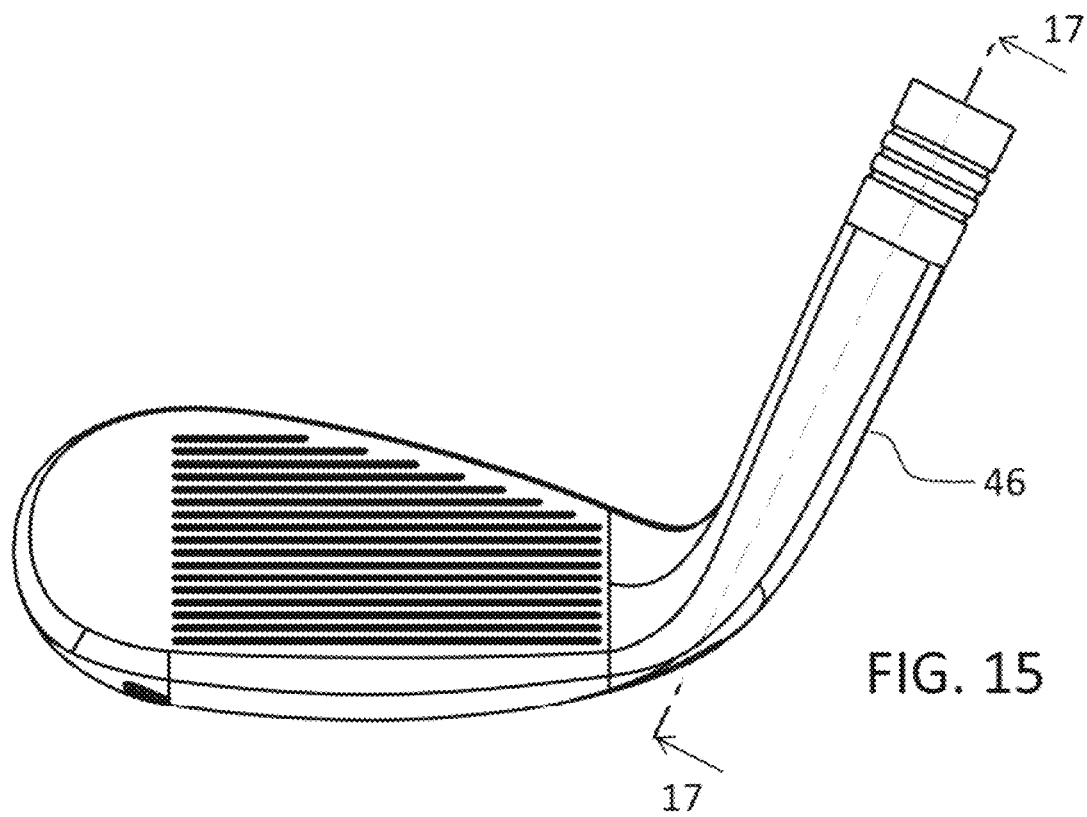
FIG. 15 is a front elevation view of an embodiment of a golf club head.
Figure 16:
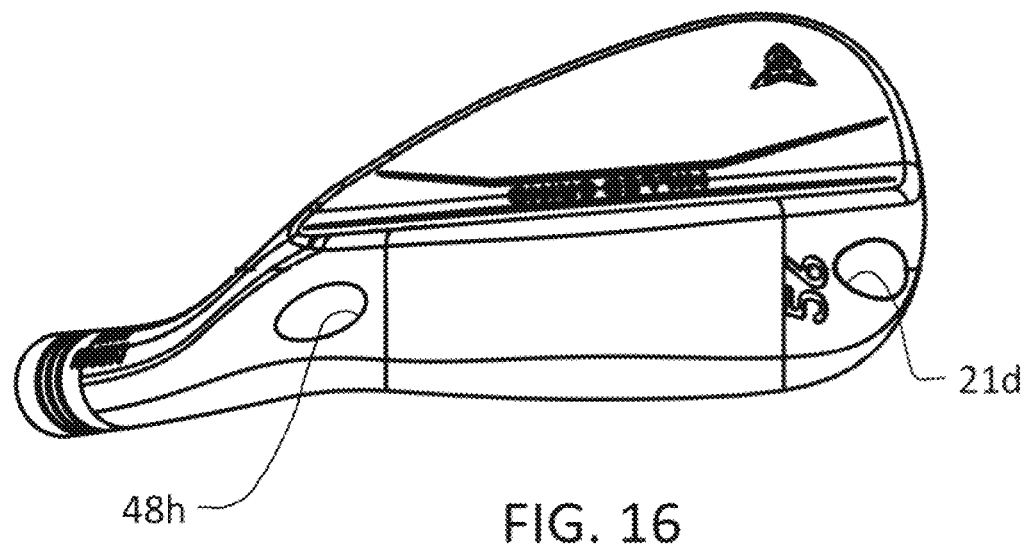
FIG. 16 is a bottom plan view of an embodiment of a golf club head.
Figure 17:
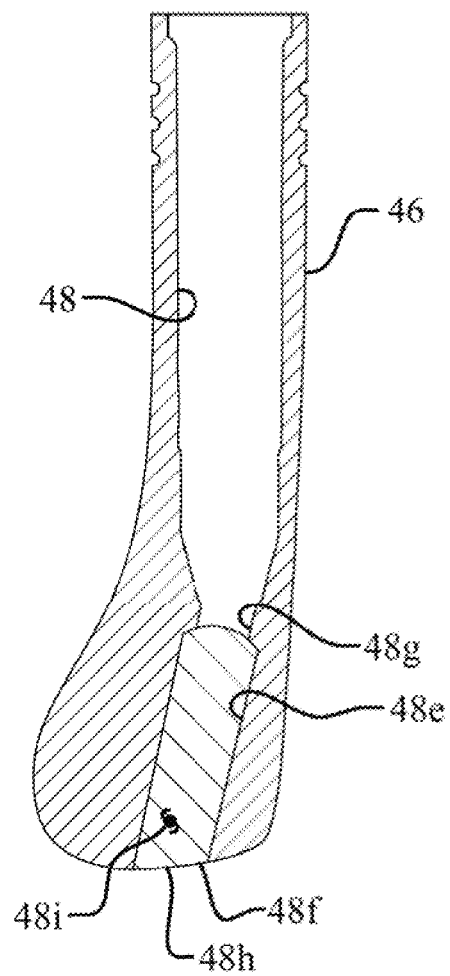
FIG. 17 is a partial cross-sectional view of an embodiment of a golf club head.
Figure 18:
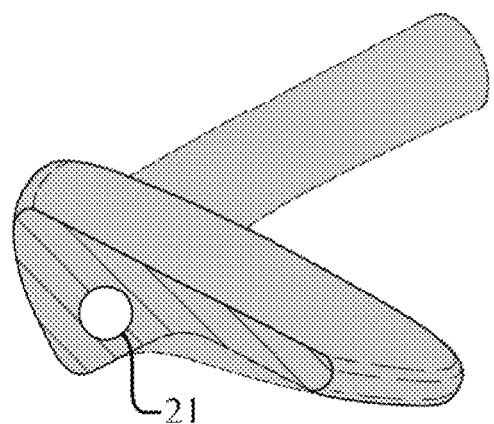
FIG. 18 is a partial cross-sectional view of an embodiment of a golf club head.
Figure 19:
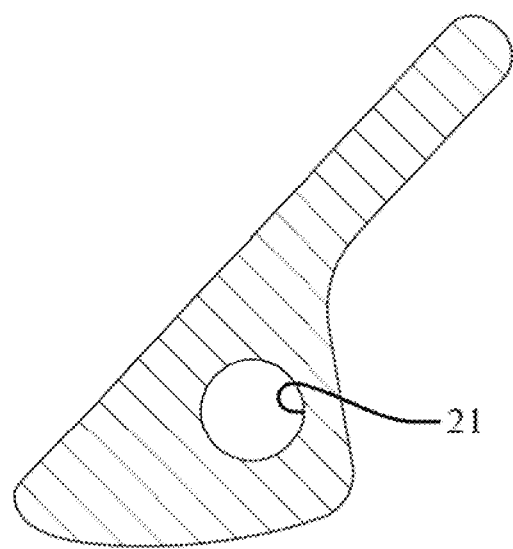
FIG. 19 is a partial cross-sectional view of an embodiment of a golf club head.

As seen in FIGS. 15 and 17, an embodiment incorporates a bore through-passageway 48e, which connects a portion of the hosel bore 48 with an external surface of the club head 12. The bore through-passageway 48e has a passageway distal end 48f at the external surface and produces a passageway opening 48h, as well as a passageway proximal end 48g, which is open to a portion of the hosel bore 48. A portion of, or all of, the bore through-passageway 48e may be filled with a passageway insert 48i, which may be metallic or non-metallic in nature. In a preferred embodiment the passageway insert 48i is a thermoplastic polyurethane, however it may preferably be any non-metallic material having a density less than the metallic portion of the club head 12, and preferably has a density of less than one-half of the density of the metallic portion of the club head 12. The bore through-passageway 48e has a volume that is preferably at least 0.25 cc, and less than one-half of a volume of the hosel bore 48, and in an embodiment the passageway insert 48i has a volume that is at least 0.25 cc, and less than one-half of a volume of the hosel bore 48. The size and volume of the bore through-passageway 48e and the passageway insert 48i are significant enough to provide weight savings and reduce undesirable club head vibrations, while not being so large as to introduce new uncommon vibrations or overly deaden the vibrations and feedback that a golfer expects to experience upon impact with a golf ball.

Further, as seen in FIGS. 16 and 18-21, an embodiment incorporates a sole portion void 21 having a void proximal end 21a, a void distal end 21b, a void length 21c, and a void volume. In some instances the sole portion void 21 extends to an exterior surface of the club head 12, thereby creating a void opening 21d. A portion of, or all of, the sole portion void 21 may be filled with a void insert 21e, which may be metallic or non-metallic in nature.

In an embodiment the void insert 21e is a thermoplastic polyurethane, however it may be any non-metallic material having a density less than the metallic portion of the club head 12, and preferably has a density of less than one-half of the density of the metallic portion of the club head 12. Alternatively, the void insert 21e is a is formed of a metallic insert secured within a portion of the sole portion void 21, which may be accomplished by welding, brazing, friction fit, mechanical attachment, or adhesives. In some embodiments the void insert 21e is a metallic alloy having a density at least 25% greater than the density of the material forming the hosel 46, while at least 50% greater in a further embodiment, and at least 75% greater in yet another embodiment. Such embodiments allow the center of gravity of the club head 12 to be shifted more toward the toe portion 24, thereby bringing the center of gravity toward the center of the striking face 16 by offsetting some of the weight associated with the hosel 46.

Figure 20:
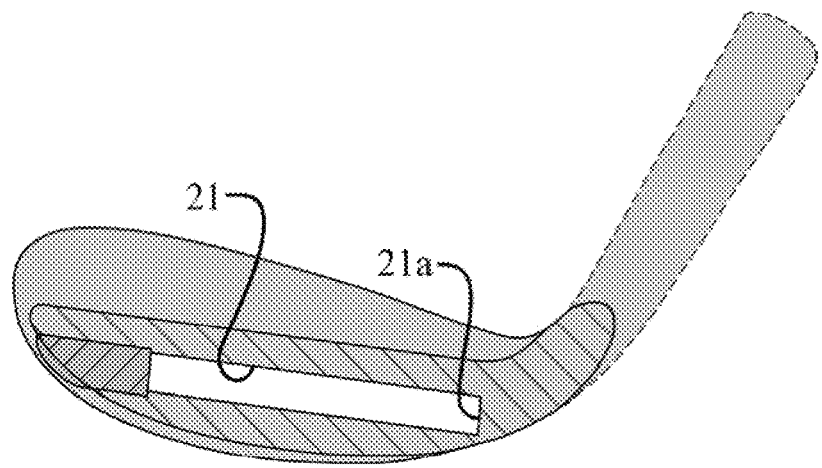
FIG. 20 is a partial cross-sectional view of an embodiment of a golf club head.
Figure 21:
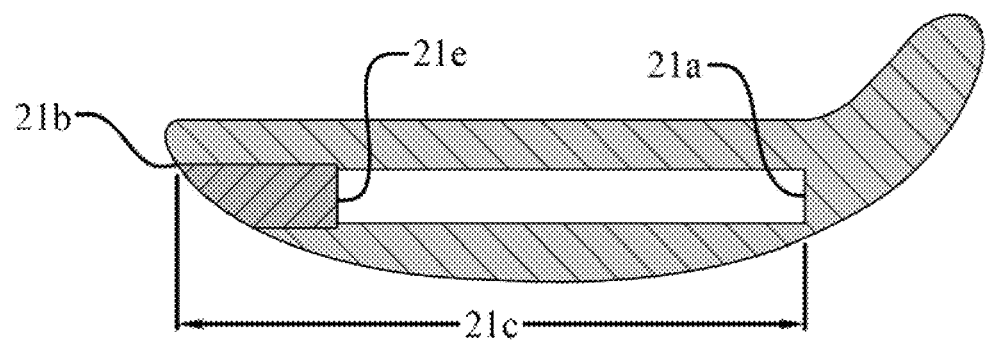
FIG. 21 is a partial cross-sectional view of an embodiment of a golf club head.

The void length 21c is preferably at least 50% of the scoreline length 62, such as at least 75% of the scoreline length 62, and at least 100% of the scoreline length 62 in another embodiment, and is preferably oriented in a heel-toe direction, as seen in FIG. 20. These embodiments produce preferred feel in that a mishit away from the center of the face 16 will still result in the ball contacting the face 16 at a point having a portion of the sole portion void 21 behind it. In one embodiment the sole portion void 21 is continuous and consistent across the portion of the club head 12 having scorelines. In fact, in one embodiment the void length 21c is greater than the sum of the scoreline length 62 and the toe-to-end-of-scorelines length 64, seen in FIG. 8. In another embodiment the void insert 21 extends into the sole portion void 21 from the void opening 21d, but does not extend into the portion of the sole portion void 21 located behind the scorelines any more than 25% of the scoreline length 62, no more than 10% in another embodiment, and in still a further embodiment the void insert 21 does not extend into any portion of the sole portion void 21 that is located behind a portion of a scoreline.

The sole portion void 21 has a volume that is preferably at least 0.5 cc, and less than the volume of the hosel bore 48, and in an embodiment the void insert 21 has a volume that is at least 0.125 cc, and less than 25% of the volume of the sole portion void 21. In another embodiment the sole portion void 21 has a volume that is preferably at least 0.75 cc, and less than 75% of the volume of the hosel bore 48, and in an embodiment the void insert 21 has a volume that is at least 0.175 cc, and less than 20% of the volume of the sole portion void 21; and in still another embodiment the sole portion void 21 has a volume that is preferably at least 1.00 cc, and less than 50% of the volume of the hosel bore 48, and in an embodiment the void insert 21 has a volume that is at least 0.200 cc, and less than 17.5% of the volume of the sole portion void 21. The size and volume of the sole portion void 21 and the void insert 21 are significant enough to provide weight savings, preferential location of the center of gravity, and produce consistent feel on impacts located away from the face center. As will be explained later in greater detail, the sole portion void 21, and/or the void insert 21, may serve as a weight adjustment parameter to fine tune the overall weight of the club head 12 to achieve a desired club head weight and swing weight.

The External Sacrificial Region

As seen in FIGS. 22-27, any of the club heads described herein may incorporate an external sacrificial region 200 formed with the club head. The external sacrificial region 200, abbreviated ESR, is an external region of the club head containing excess material, a portion of which is intended to be removed to provide a precisely machined surface or desired transition to the contour of the club head. Strategic use of the external sacrificial region 200 allows for improved customization of the club head, including, but not limited to, improved milling surface to achieve a wide variety of sole grinds and neck blends on a single club head blank 250, and the ability to create preferred leading edge profiles and/or locations. Unlike traditional weight pads intended to be milled to achieve a target weight, the present external sacrificial regions 200 are located on areas of the club head intended to contact the ball or the ground.

As previously noted with respect to FIG. 1, the lower tangent point 190 on the outer surface of the club head 100 of a line 191 forming a 45 degree angle relative to the ground plane 111 defines a demarcation boundary between the sole portion 108 and the toe portion 104. The club head 100 has a sole length, $L_B$, defined as the distance between two points projected onto the ground plane 111. A heel side 116 of the sole is defined as the intersection of a projection of the hosel axis 115 onto the ground plane 111. A toe side 117 of the sole is defined as the intersection point of the vertical projection of the lower tangent point 190 (described above) onto the ground plane 111. The distance between the heel side 116 and toe side 117 of the sole is the sole length $L_B$ of the club head. In order to define a sole surface area an imaginary horizontal plane it created parallel to the ground plane 111 and offset 5 mm above the ground plane 111. The sole surface area includes the area of the entire surface between the ground plane 111 and the 5 mm imaginary offset plane, throughout the sole length $L_B$, that is oriented facing the ground plane 111 such that a line normal to the surface is oriented at least 10 degrees from the horizontal 5 mm imaginary offset plane toward the ground plane 111.

As previously noted with respect to FIG. 2, the leading edge 142 is defined as the midpoint of a radius connecting the sole portion 108 and the face plane 125. The leading edge surface area includes the entire area created by the radius throughout the sole length $L_B$.

The external sacrificial region 200 includes an ESR thickness 202 that is at least 0.25 mm, however in an embodiment the ESR thickness 202 that is at least 0.50 mm, and in a further embodiment it is at least 0.75 mm. In another embodiment the ESR thickness 202 is no more than 2.00 mm.

The external sacrificial region 200 may include an ESR sole portion 210, which is the portion of the external sacrificial region 200 located on the sole surface area. Further, the external sacrificial region 200 may include an ESR leading edge portion 220, which is the portion of the external sacrificial region 200 located on the leading edge surface area. Additionally, the external sacrificial region 200 may include an ESR face portion 230, which is the portion of the external sacrificial region 200 located on the flat face plane 125, however in embodiments having a curved striking face the ESR face portion 230 is that portion of the external sacrificial region 200 located on the striking face 16 having a substantially constant bulge radius. Lastly, the external sacrificial region 200 may include an ESR neck blend portion 240, which is the portion of the external sacrificial region 200 located between the sole heel side 116 and the hosel top edge 46a, and located in front of a shaft axis plane defined as a vertical plane containing the hosel bore axis 48c.

Figure 22:
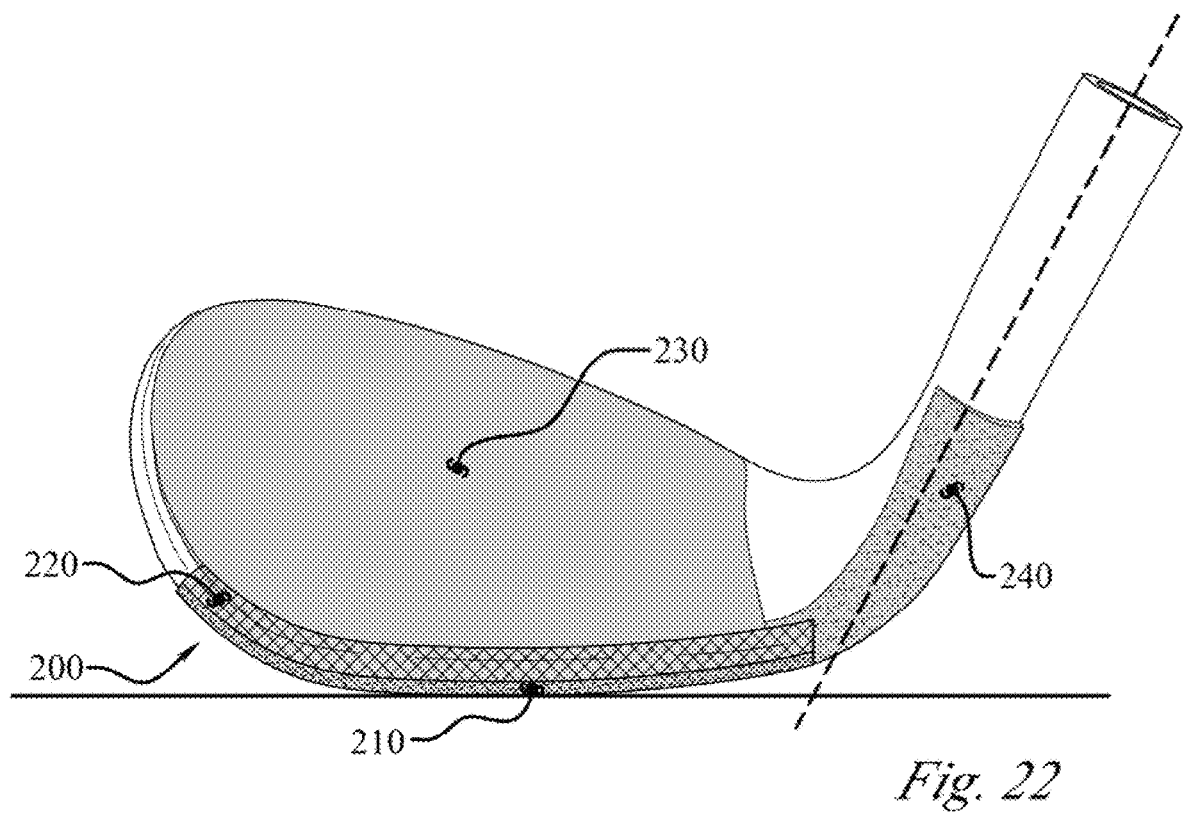
FIG. 22 is a front elevation view of an embodiment of a golf club head blank.
Figure 23:
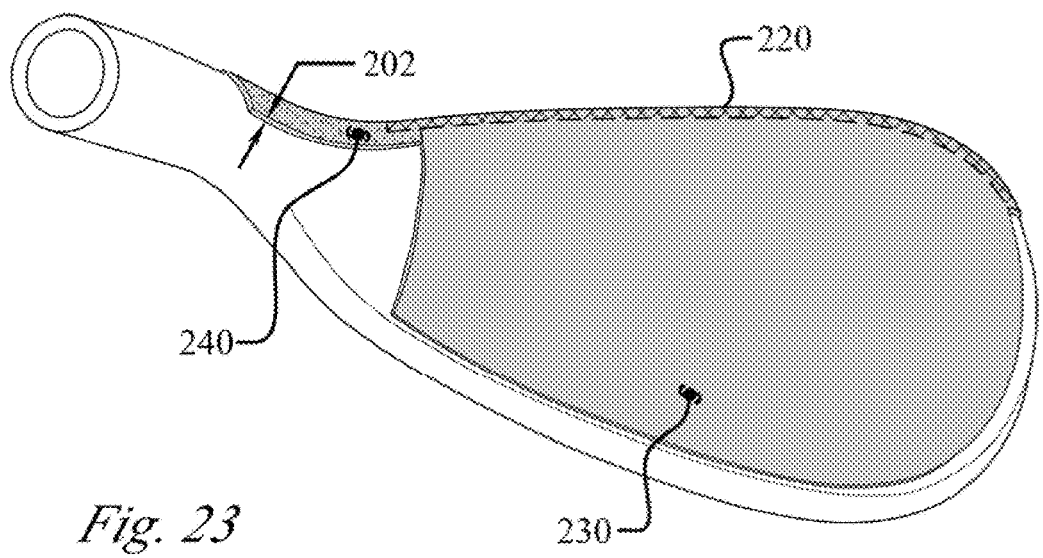
FIG. 23 is a top plan view of an embodiment of a golf club head blank.
Figure 24:
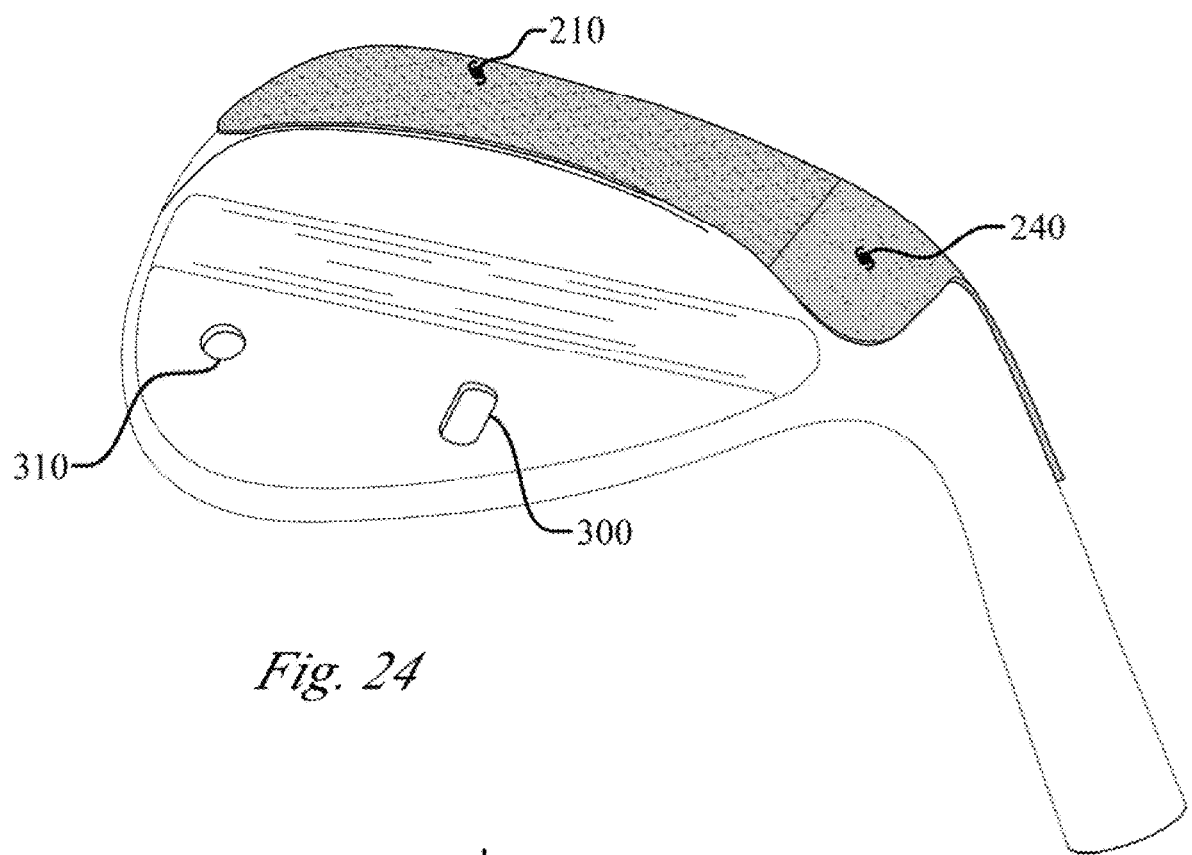
FIG. 24 is a perspective view of an embodiment of a golf club head blank.
Figure 25:
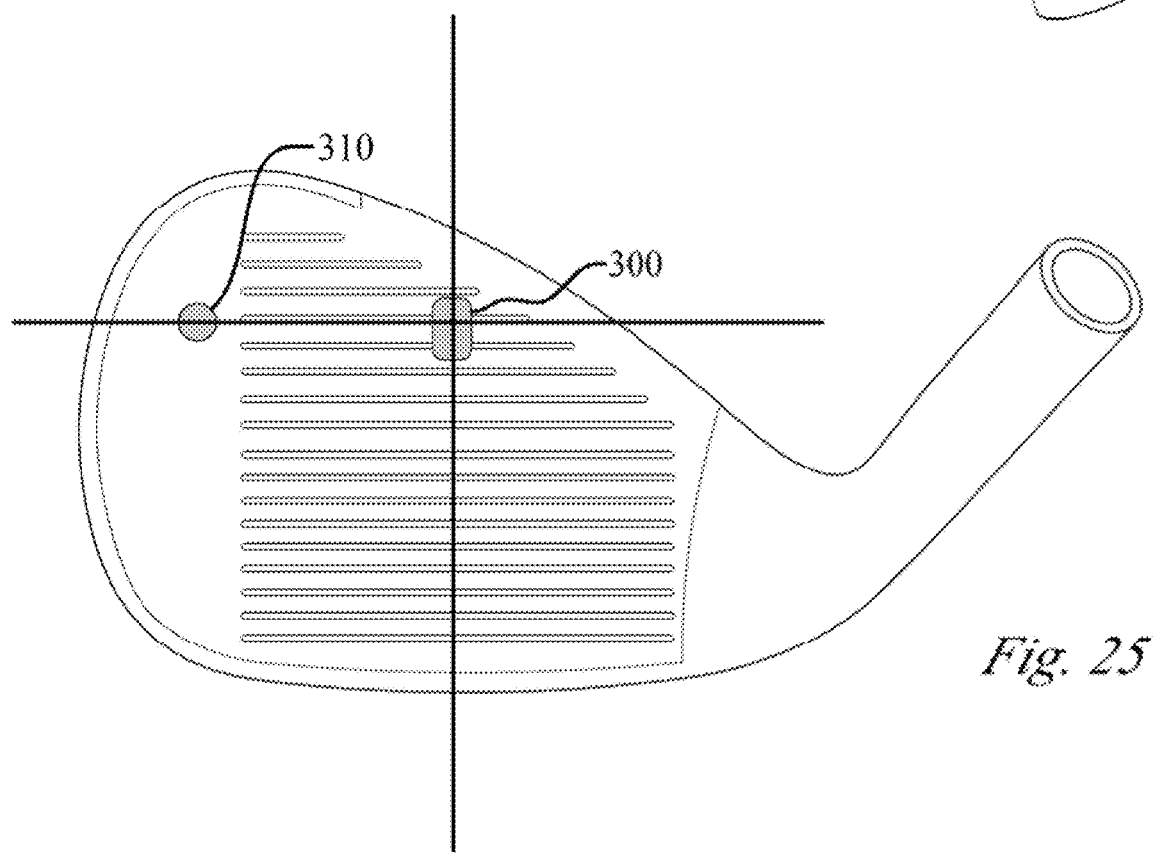
FIG. 25 is a rotated front elevation view of an embodiment of a golf club head blank so that the face is in a vertical plane.
Figure 26:
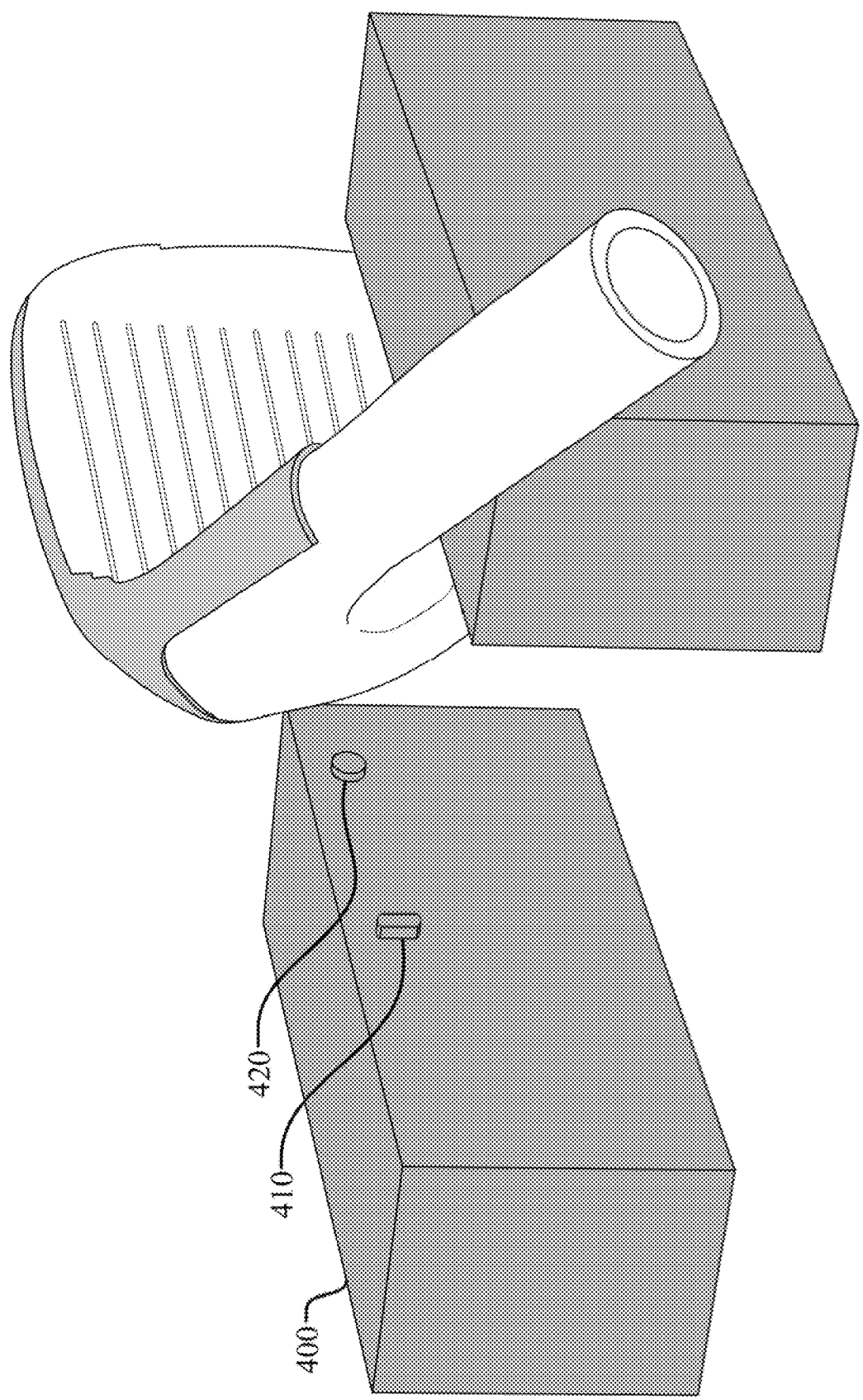
FIG. 26 is a perspective view of an embodiment of a golf club head blank.
Figure 27:
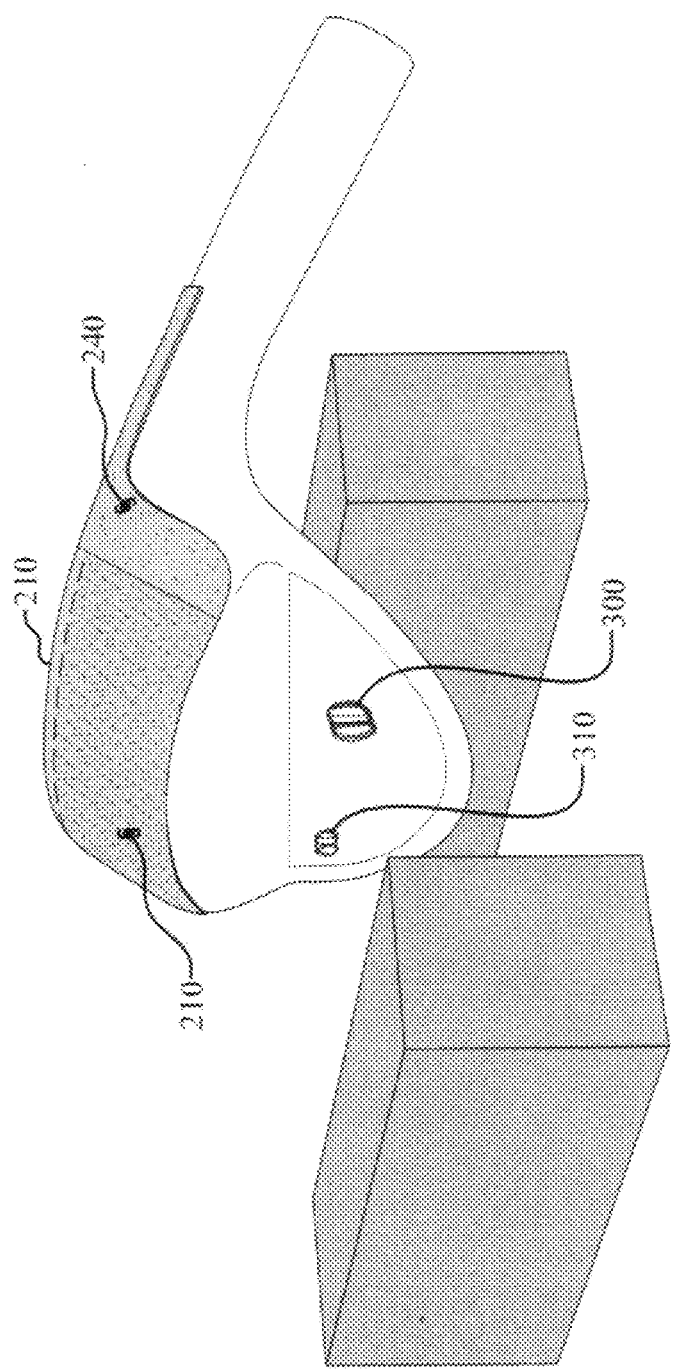
FIG. 27 is a perspective view of an embodiment of a golf club head blank.
Figure 28:
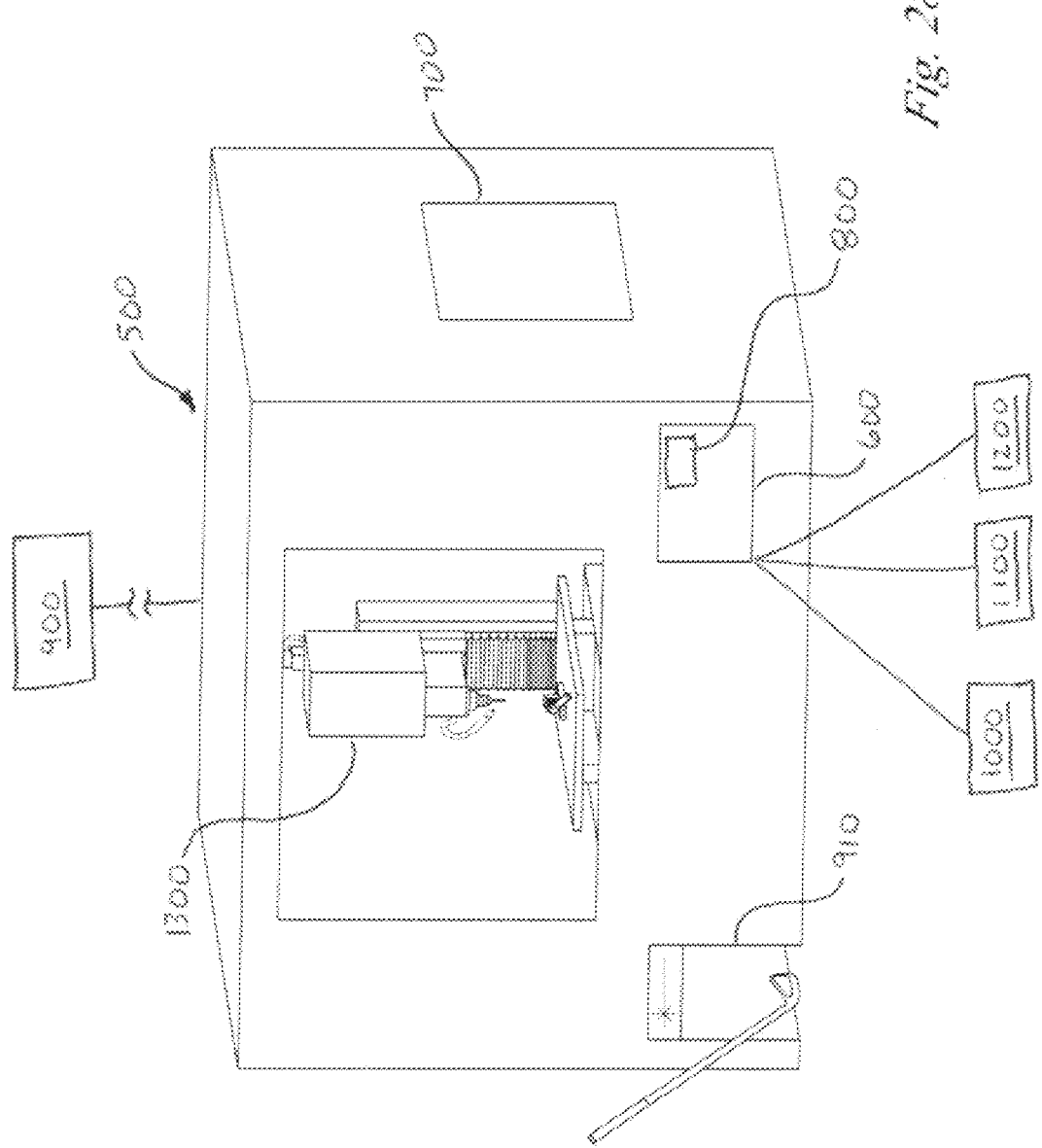
FIG. 28 is a perspective view of an embodiment of a kiosk.
Figure 29:
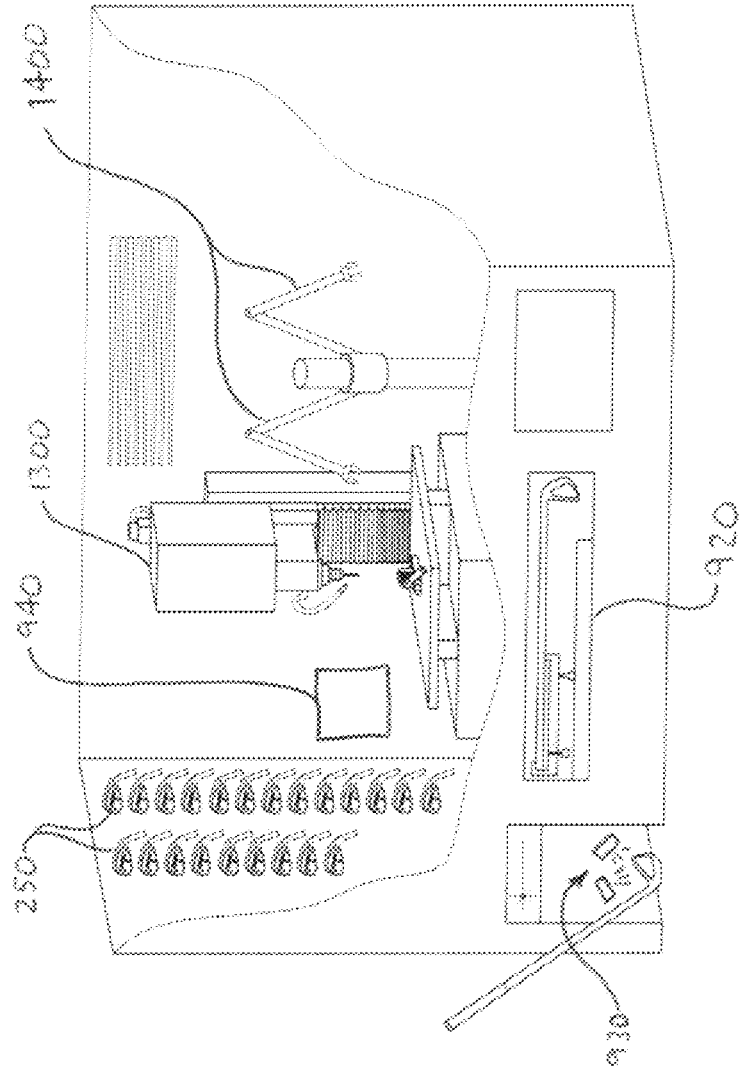
FIG. 29 is a perspective view of an embodiment of a kiosk.

The previously discussed club heads 12, 100 represent a finished golf club head after portions of the external sacrificial region 200 have been machined from a club head blank 250, seen in FIGS. 22-24. The disclosure will first discuss a wedge type golf club head, however one of skill in the art will appreciate that the disclosure applies equally to less lofted club heads, as will be discussed in more detail.

Thus, in one embodiment the process of producing a finished club head begins with a step of forming a club head blank 250 having a blank loft of at least 43 degrees, a blank lie angle of at least 64 degrees, and a blank head weight of 345-400 grams. The club head blank includes a body 14, 113 including a hosel 46, 114, a heel portion 22, 116, a sole portion 20, 108, a toe portion 24, 117, a top-line portion 18, 106, a face portion 16, 110, and a leading edge 16a, 142 joining the face portion 16, 110 and the sole portion 20, 108, and the sole portion 20, 108 extends rearwardly from the leading edge 16a, 142. In this embodiment the club head blank 250 includes an external sacrificial region 200 having an ESR thickness 202, an ESR sole portion 210, an ESR face portion 230, and an ESR leading edge portion 220. A finished club head having a finished club head weight of less than 310 grams is formed from the club head blank 250 by machining off an ESR removed mass from at least a portion of the external sacrificial region 200 including at least a portion of the ESR sole portion 210, a portion of the ESR face portion 230, and a portion of the ESR leading edge portion 220. In one embodiment less than 70% of the ESR removed mass is removed from the ESR face portion, while at least 20% of the ESR removed mass is removed from the ESR sole portion, and at least 50% of the ESR leading edge portion is machined to produce a finished leading edge radius. In another embodiment at least 75% of the ESR leading edge portion is machined to produce a finished leading edge radius, while in an even further embodiment all of the ESR leading edge portion is machined. In a further embodiment majority of the ESR sole portion 210 is machined off to produce the finished sole profile, while in another embodiment at least 75% of the ESR sole portion 210 is machined, and in still a further embodiment the entire ESR sole portion 210 is machined. Additionally, in still another embodiment majority of the ESR face portion 230 is machined off to produce the finished sole profile, while in another embodiment at least 75% of the ESR face portion 230 is machined, and in still a further embodiment the entire ESR face portion 230 is machined.

This disclosure applies equally to other iron type golf club heads conventionally referred to as a 3-iron, 4-iron, 5-iron, 6-iron, 7-iron, 8-iron, and 9-iron, however with the loft, lie, blank head weight, and finished head weight adjusted accordingly, one embodiment of which is seen in Table 1; as well as hybrid iron type golf club heads, often referred to as rescue golf club heads, generally having a hollow construction and curved, or flat, faces, however with the loft, lie, blank head weight, and finished head weight adjusted accordingly, one embodiment of which is seen in Table 2; as well as fairway wood type golf club heads, generally having a hollow construction and curved faces, however with the loft, lie, blank head weight, and finished head weight adjusted accordingly, one embodiment of which is seen in Table 3; and even driver golf club heads, generally having a hollow construction and curved faces, however with the loft, lie, blank head weight, and finished head weight adjusted accordingly, one embodiment of which is seen in Table 4.

TABLE 1

|  | 3-iron | 4-iron | 5-iron | 6-iron | 7-iron | 8-iron | 9-iron |
| --- | --- | --- | --- | --- | --- | --- | --- |
| Blank Head Weight (grams) | 275-315 | 285-325 | 290-335 | 300-345 | 305-365 | 310-375 | 315-385 |
| Finished Head Weight (grams) ± 2 g | 240 | 247 | 254 | 261 | 268 | 275 | 282 |
| Loft (degrees) ± 2 degrees | 21 | 24 | 27 | 30 | 34 | 38 | 42 |
| Lie (degrees) ± 2 degrees | 60.5 | 61.0 | 61.5 | 62 | 62.5 | 63 | 63.5 |

TABLE 2

|  | 2-hybrid | 3-hybrid | 4-hybrid | 5-hybrid | 6-hybrid | 7-hybrid |
| --- | --- | --- | --- | --- | --- | --- |
| Blank Head Weight (grams) | 250-290 | 260-300 | 270-310 | 280-320 | 290-330 | 300-340 |
| Finished Head Weight (grams) ± 3 g | 217 | 227 | 237 | 247 | 257 | 267 |
| Loft (degrees) ± 3 degrees | 16.5 | 19 | 22 | 25 | 28 | 32 |
| Lie (degrees) ± 2 degrees | 56.75 | 58.00 | 59.25 | 60.25 | 61.25 | 62.25 |

TABLE 3

|  | 3 fairway wood | 5 fairway wood |
| --- | --- | --- |
| Blank Head Weight (grams) | 250-290 | 255-295 |
| Finished Head Weight (grams) ± 3 g | 215 | 218 |

TABLE 3-continued

|  | 3 fairway wood | 5 fairway wood |
|---|---|---|
| Loft (degrees) ± 3 degrees | 17 | 20 |
| Lie (degrees) ± 2 degrees | 58.00 | 58.50 |

TABLE 4

|  | driver |
|---|---|
| Blank Head Weight (grams) | 230-270 |
| Finished Head Weight (grams) ± 3 g | 195-205 |
| Loft (degrees) ± 3 degrees | 11 |
| Lie (degrees) ± 2 degrees | 58.00 |

As disclosed herein, the external sacrificial region 200 may include any one, or more, of the following: an ESR sole portion 210, an ESR face portion 230, an ESR leading edge portion 220, an ESR neck blend portion 240, and even an ESR crown portion, not illustrated, but understood by one skilled in the art, particularly in light of U.S. patent application Ser. No. 14/330,205, which is incorporated by reference.

In some embodiments majority of the portion of the ESR leading edge portion 220 that is machined is adjacent to a portion of the ESR face portion 230 that is also machined. In further embodiments majority of the portion of the ESR leading edge portion 220 that is machined is adjacent to a portion of the ESR sole portion 210 that is also machined. Even further, at least 70% of the ESR leading edge portion 220 is machined in additional embodiments, and at least 90% of the ESR leading edge portion 220 is machined in still further embodiments. Machining external sacrificial regions 200 of adjacent surfaces provides improved precision and customization capabilities, while eliminating the waste of time, energy, and material associated with machining a golf club head from a billet.

In one embodiment the ESR face portion covers at least 1800 mm$^2$, the ESR sole portion covers at least 900 mm$^2$, and the ESR leading edge portion covers at least 50 mm$^2$, and wherein the ESR thickness is less than 2.5 mm, while in a further embodiment the ESR face portion covers at least 2500 mm$^2$, the ESR sole portion covers at least 1250 mm$^2$, and the ESR leading edge portion covers at least 75 mm$^2$, and in yet another embodiment ESR face portion covers at least 3200 mm$^2$, the ESR sole portion covers at least 1600 mm$^2$, and the ESR leading edge portion covers at least 100 mm$^2$. In yet another embodiment the ESR face portion covers at least 3000 mm$^2$, the ESR sole portion covers at least 1500 mm$^2$, and the ESR leading edge portion covers at least 100 mm$^2$, and wherein the ESR thickness 202 is no more than 2.0 mm. The ESR thickness referred to herein is the average thickness for all areas that have material removed by machining, thereby allowing for some areas having greater thicknesses. In one embodiment the ESR thickness is at least 0.25 mm, such as at least 0.50 mm in a further embodiment, and at least 0.75 mm in still another embodiment. One particular embodiment has an average ESR thickness of the ESR face portion 230 is less than an average ESR thickness of the ESR sole portion 210, while in an even further embodiment an average ESR thickness of the ESR face portion 230 is less than an average ESR thickness of the ESR leading edge portion 220, and in still another embodiment an average ESR thickness of the ESR face portion 230 is less than an average ESR thickness of the ESR neck blend portion 230.

Traditional manufacturing techniques often result in inconsistent curvatures of the finished leading edge, both from head to head as well as across the length of the leading edge of a single club head. Such variabilities may be the result of inconsistencies in casting and forging, but more often they are the result of hand polishing and grinding of the club head during finishing, which often leaves one or more flat areas along the leading edge. Such inconsistencies can be detected by a golfer as they impact how well the leading edge passes through the grass and/or impacts the ground.

In some embodiments at least 0.25 grams of the ESR removed mass is removed from the ESR leading edge portion 220, at least 2.5 grams of the ESR removed mass is removed from the ESR sole portion 210, and at least 5.0 grams of the ESR removed mass is removed from the ESR face portion 230. Unlike club heads machined from a large billet, in one embodiment the ESR removed mass removed from the ESR sole portion 210 is at least 30% of the ESR removed mass removed from the ESR face portion 230, while in a further embodiment the ESR removed mass removed from the ESR sole portion 210 is no more than 125% of the ESR removed mass removed from the ESR face portion 230, and in yet another embodiment the ESR removed mass removed from the ESR sole portion 210 is 40-80% of the ESR removed mass removed from the ESR face portion 230. In one particular embodiment 20-60% of the ESR removed mass is removed from the ESR face portion 230, while in an even further embodiment 15-45% of the ESR removed mass is removed from the ESR sole portion 210. Generally the ESR removed mass removed is 10-40% of the finished club head weight, such as 12-35% in an embodiment, 14-32% in another embodiment, and at least 16% in yet a further embodiment. In one embodiment the ESR removed mass removed is preferably at least 0.55 grams per degree of loft, and no more than 3.75 grams per degree of loft. In further embodiments at least 0.50 grams of the ESR removed mass is removed from the ESR leading edge portion 220, at least 5.0 grams of the ESR removed mass is removed from the ESR sole portion 210, and at least 10.0 grams of the ESR removed mass is removed from the ESR face portion 230, such as at least 0.75 grams of the ESR removed mass is removed from the ESR leading edge portion 220, at least 7.5 grams of the ESR removed mass removed from the ESR sole portion 210, and at least 15.0 grams of the ESR removed mass is removed from the ESR face portion 230. In still another embodiment 0.5-4.0 grams of the ESR removed mass is removed from the ESR leading edge portion 220, at least 5.0-40.0 grams of the ESR removed mass is removed from the ESR sole portion 210, and 10.0-50.0 grams of the ESR removed mass is removed from the ESR face portion 230.

Further, in embodiments incorporating an ESR neck blend portion 240, at least 0.25 grams of the ESR removed mass is removed from the ESR neck blend portion 240, such as at least 0.50 grams in another embodiment, and at least 1.0 grams in still a further embodiment. One particular embodiment has the ESR removed mass removed from the ESR neck blend portion 240 being greater than the ESR removed mass is removed from the ESR leading edge portion 220, while in a further embodiment the ESR removed mass removed from the ESR neck blend portion 240 is less than the ESR removed mass is removed from the ESR sole portion 210, such as less than 75% of the ESR removed mass is removed from the ESR sole portion 210. In another embodiment the ESR removed mass removed from the ESR neck blend portion 240 is less than the ESR removed mass is removed from the ESR face portion 230, such as less than 75% of the ESR removed mass is removed from the ESR face portion 230. In another embodiment the ESR removed mass removed from the ESR neck blend portion 240 is both (a) less than 50% of the ESR removed mass is removed from the ESR sole portion 210, and (b) less than 50% of the ESR removed mass is removed from the ESR face portion 230. Some embodiments even have a portion of the ESR neck blend portion 240 that extends to an elevation above a ground plane that is greater than a height of a center of gravity of the finished club head, and at least a portion of the ESR neck blend portion located above the center of gravity of the finished club head is machined off to create the finished club head.

The step of machining off at least a portion of the ESR sole portion 210 and a portion of the ESR leading edge portion 220 may be performed with the club head blank 250 held in a single orientation with a single machine tool. Still further, the step of machining off at least a portion of the ESR sole portion 210 and a portion of the ESR leading edge portion 220 may be performed in a single continuous operation. Even further, in one particular embodiment a portion of the ESR face portion 230 is machined off first producing a step discontinuity with at least a portion of the ESR neck blend portion 240, then in a single orientation and with a single machine tool, at least a portion of the ESR sole portion 210, a portion of the ESR leading edge portion 220, and a portion of the ESR neck blend portion 240, including the step discontinuity, are removed. In an embodiment the single machine tool is a ball end mill, which in a further embodiment has a tool diameter of 2 mm or less. In another embodiment, recognizing the significance of the finished leading edge geometry to performance, the ball end mill machining of the ESR leading edge portion is carried out with a step-over distance that is less than the finished leading edge radius, and produces a scallop height of less than 50% of the finished leading edge radius; while in another embodiment the ball end mill machining of the ESR leading edge portion is carried out with a step-over distance that is less than 75% of the finished leading edge radius, and produces a scallop height of less than 35% of the finished leading edge radius; and in still a further embodiment the ball end mill machining of the ESR leading edge portion is carried out with a step-over distance that is less than 25-75% of the finished leading edge radius, and produces a scallop height of 10-35% of the finished leading edge radius. While some embodiments utilize a single machine tool to machine the ESR sole portion 210 and the ESR leading edge portion 220, this is not required in embodiments in which the properties of the ball end mill vary by less than 50%. Thus, in one embodiment the ball end mill used in machining the ESR sole portion 210 has a tool diameter of 3 mm or less. Similarly, in another embodiment, recognizing the significance of the transition of the sole geometry to the finished leading edge geometry to performance, the ball end mill machining of the ESR sole portion 210 is carried out with a step-over distance that is less than 150% of the finished leading edge radius, and produces a scallop height of less than 75% of the finished leading edge radius; while in another embodiment the ball end mill machining of the ESR sole portion 210 is carried out with a step-over distance that is less than the finished leading edge radius, and produces a scallop height of less than 70% of the finished leading edge radius; and in still a further embodiment the ball end mill machining of the ESR sole portion 210 is carried out with a step-over distance that is less than 25-100% of the finished leading edge radius, and produces a scallop height of 15-70% of the finished leading edge radius. In one embodiment the same ball end machine tool is used in machining both the ESR sole portion 210 and the ESR leading edge portion 220 and is carried out with a step-over distance of 1.5 mm or less, and in another embodiment produces a scallop height of less than 0.50 mm.

With a finished club head in a design position, a hosel centerline axis 115 establishes a vertical shaft axis plane containing the hosel centerline axis 115. Further, a vertical front-to-rear plane is perpendicular to the vertical shaft axis plane. Additionally, a tool path plane is vertical and within a path angle of the vertical front-to-rear plane. In other words, keeping the vertical front-to-rear plane in the vertical position and rotating it from the initial position perpendicular to the vertical shaft axis plane through an angle referred to as the path angle, establishes the tool path plane. In an embodiment, during the step of machining the ESR leading edge portion, the machine tool traverses the ESR leading edge portion along a machine tool path that lies between the vertical front-to-rear plane and the tool path plane, and the path angle is no more than 35 degrees, such as no more than 25 degrees in a further embodiment, no more than 15 degrees in another embodiment, and no more than 5 degrees in still a further embodiment. One skilled in the art will appreciate that for simplicity these planes are defined based upon the finished club head being in the design position, however actual machining of the blank club head 250 may be performed in any orientation and the defined planes rotate with the club head to define the path of the machine tool, essentially with respect to the front-to-rear direction of the club head. Without limiting the invention, it is convenient to visualize the blank club head 250 in a design position, such as that of FIG. 22, with a ball end mill machine tool traversing the ESR sole portion 210 along the tool path plane to the ESR leading edge portion 220, and then traveling vertically around the ESR leading edge portion 220, removing ESR material in the process, to perfectly blend with the previously machined face and avoiding machining scallop lines that are substantially parallel to the finished leading edge, which may adversely impact how the finished leading edge interacts with grass and the ground. With respect to the machining of the ESR leading edge portion 220, in some embodiments the tool path plane changes as the machine tool gets farther away from a vertical midpoint demarcation plane, which is a plane that passes through the midpoint of the longest score-line groove 112 and is perpendicular to the vertical shaft axis plane, thereby facilitating tighter control of the curvature of the leading edge and the blend into the face. In one embodiment the tool path plane rotates at least one-half a degree for every 10 mm the machine tool is horizontally displaced from the vertical midpoint demarcation plane, while in another embodiment the tool path plane rotates at least one degree for every 10 mm the machine tool is horizontally displaced from the vertical midpoint demarcation plane, and in an even further embodiment the tool path plane rotates at least 1.5 degrees for every 10 mm the machine tool is horizontally displaced from the vertical midpoint demarcation plane. In one embodiment the rotation of the tool path plane is such that it intersects the vertical midpoint demarcation plane behind the face. However in an alternative embodiment the rotation of the tool path plane is such that it intersects the vertical midpoint demarcation plane in front of the face.

The ESR leading edge portion 220 may be configured to have an initial curved leading edge, with a blank leading edge radius, or the ESR leading edge portion 220 may be configured so that at least a portion of the ESR sole portion 210 and a portion of the ESR face portion 230 meet along a flat surface of the ESR leading edge portion 220 producing an initial leading edge that has a flat surface for ease of manufacturing the club head bland 250. One embodiment has a flat surface, on the initial leading edge of the ESR leading edge portion 220, that extends throughout at least 25% of the sole length, $L_B$, such as throughout at least 50% of the sole length, $L_B$, in another embodiment, and throughout at least 75% of the sole length, $L_B$, in yet a further embodiment. In an alternative series of embodiments, a curved surface, on the initial leading edge of the ESR leading edge portion 220, may extend throughout at least 25% of the sole length, $L_B$, in one embodiment, such as throughout at least 50% of the sole length, $L_B$, in another embodiment, and throughout at least 75% of the sole length, $L_B$, in yet a further embodiment. In an embodiment the blank leading edge of the ESR leading edge portion 220 has a blank leading edge radius, and the finished leading edge radius is at least 25% less than the blank leading edge radius, while in a further embodiment the finished leading edge radius is 25-75% less than the blank leading edge radius, and in yet another embodiment the finished leading edge radius is 25-50% less than the blank leading edge radius. In a preferred embodiment the finished leading edge contains no flat surfaces throughout at least 50% of the sole length, $L_B$, such as throughout at least 75% of the sole length, $L_B$, in another embodiment, such as throughout the entire sole length, $L_B$, in still a further embodiment. In one particular embodiment the finished leading edge radius is 1.0-4.0 mm, such as a finished leading edge radius is 1.5-3.5 mm in another embodiment, and no more than 3.0 mm in a further embodiment, and no more than 2.5 mm in still another embodiment.

Yet another advantage of using the disclosed machining techniques on at least a portion of the ESR sole portion 210 and at least a portion of the ESR leading edge portion 220 is that the finished leading edge radius may vary along the finished leading edge providing preferred turf and ground interaction attributes. For instance, the finished club head is divided into a toe half and a heel half by using a vertical midpoint demarcation plane that passes through the midpoint of the longest score-line groove 112, wherein the vertical midpoint demarcation plane is perpendicular to the vertical shaft axis plane, the portion of the club head containing the hosel is the heel half, with the portion on the other side of the demarcation plane being the toe half. A score-line area toe boundary plane is parallel to the vertical midpoint demarcation plane and passes through the toewardmost point of the longest score-line groove, and similarly a score-line area heel boundary plane is parallel to the vertical midpoint demarcation plane and passes through the heelward-most point of the longest score-line groove. In one embodiment a portion of the finished leading edge, between the vertical midpoint demarcation plane and the score-line area heel boundary plane, has a heel minimum leading edge radius that is less than a toe minimum leading edge radius that is located on the finished leading edge between the vertical midpoint demarcation plane and the score-line area toe boundary plane. In a further embodiment, the greatest leading edge radius located between the score-line area heel boundary plane and the score-line area toe boundary plane, is located between the vertical midpoint demarcation plane and the score-line area toe boundary plane. Conversely, in another embodiment the finished leading edge, between the vertical midpoint demarcation plane and the score-line area heel boundary plane, has a heel minimum leading edge radius that is greater than a toe minimum leading edge radius that is located on the finished leading edge between the vertical midpoint demarcation plane and the score-line area toe boundary plane. Similarly, in a further embodiment, the greatest leading edge radius located between the score-line area heel boundary plane and the score-line area toe boundary plane, is located between the vertical midpoint demarcation plane and the score-line area heel boundary plane. In still a further embodiment the leading edge radius at the vertical midpoint demarcation plane is at least 10% greater than the leading edge radius at the score-line area toe boundary plane, such as at least 20% greater in another embodiment, and at least 30% greater in yet a further embodiment. Similarly, in another embodiment the leading edge radius at the vertical midpoint demarcation plane is at least 10% greater than the leading edge radius at the score-line area heel boundary plane, such as at least 20% greater in another embodiment, and at least 30% greater in yet a further embodiment.

With continued reference to the vertical midpoint demarcation plane, score-line area heel boundary plane, and the score-line area toe boundary plane, in one embodiment majority of the ESR removed mass taken from the ESR sole portion 210 is removed between the vertical midpoint demarcation plane and the score-line area heel boundary plane, while majority of the ESR removed mass taken from the ESR face portion 230 is removed from the opposite side of the vertical midpoint demarcation plane. In a further embodiment the minority of the total ESR removed mass is from the portion on the hosel side of the vertical midpoint demarcation plane, with the majority removed from the opposite side of the vertical midpoint demarcation plane. However, in still another embodiment the club head blank 250 has a club head blank CG location and the finished club head has a finished club head CG location. In an embodiment a shortest distance from the club head blank CG location to the finished club head CG location is no more than 2 mm, such as no more than 1.5 mm in another embodiment, and no more than 1.0 mm in yet another embodiment.

Figure 30:
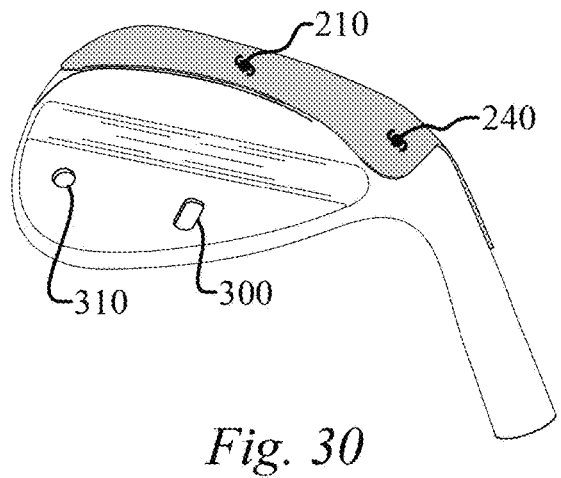
FIG. 30 is a perspective view of an embodiment of a golf club head blank.
Figure 31:
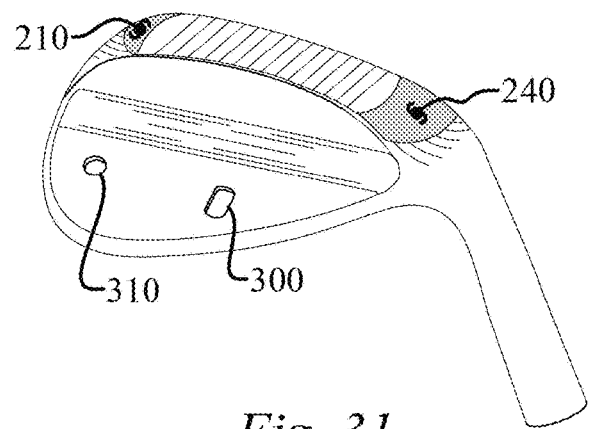
FIG. 31 is a perspective view of an embodiment of a golf club head.
Figure 32:
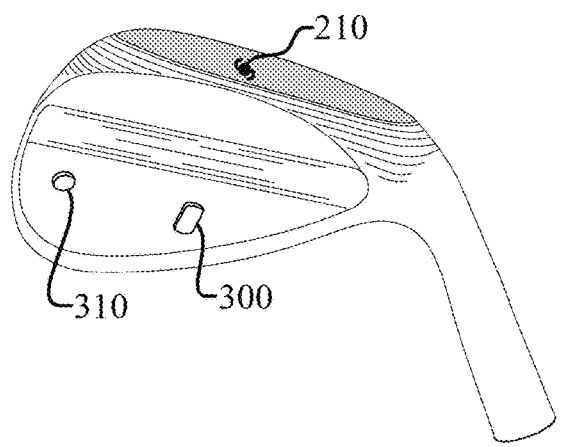
FIG. 32 is a perspective view of an embodiment of a golf club head.
Figure 33:
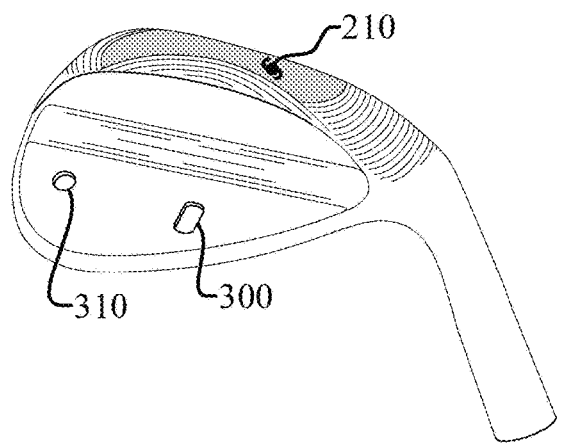
FIG. 33 is a perspective view of an embodiment of a golf club head.
Figure 34:
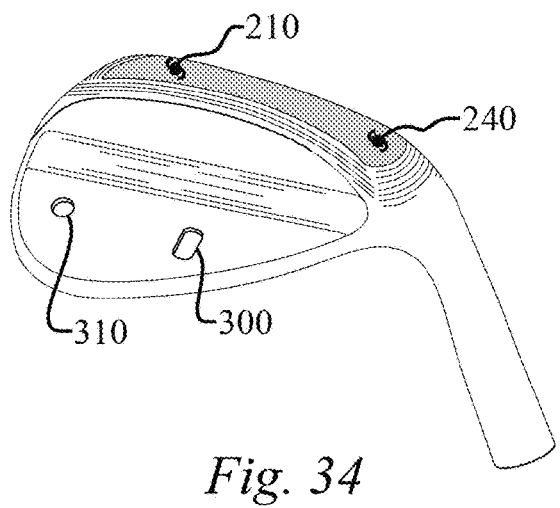
FIG. 34 is a perspective view of an embodiment of a golf club head.
Figure 35:
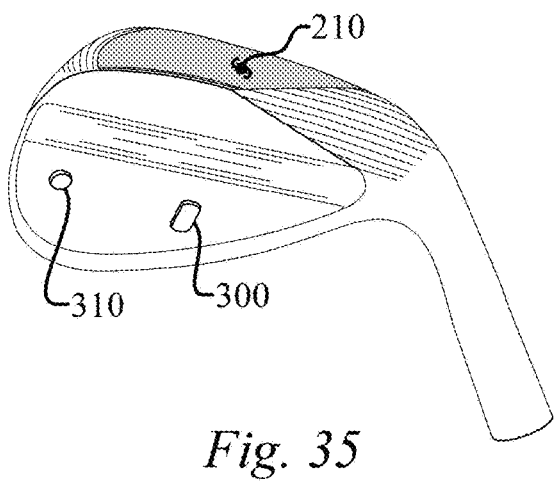
FIG. 35 is a perspective view of an embodiment of a golf club head.
Figure 36:
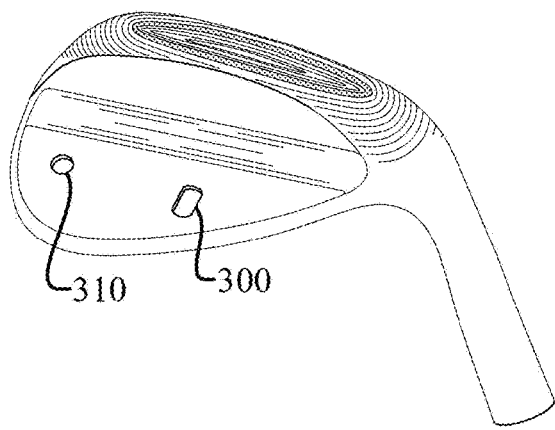
FIG. 36 is a perspective view of an embodiment of a golf club head.

The external sacrificial region 200 is a way to create repeatable club head blanks 250, from which select areas of the external sacrificial region 200 may be removed to achieve desired curvatures and/or profiles of the contact surfaces of a finished club head. In one embodiment the step of machining a portion of the ESR sole portion establishes a sole contact point, and in another embodiment the step of machining a portion of the ESR sole portion and a portion of the ESR leading edge portion establishes a leading edge height of the finished club head, while in an even further embodiment the step of machining a portion of the ESR sole portion establishes a bounce of the finished club head. Traditionally hand grinding and polishing during the finishing process essentially establishes the sole contact point, leading edge height, and bounce, whether intentionally or unintentionally. Such hand operations introduce significant variability from one club head to another. Utilizing the disclosed external sacrificial region 200 and machining techniques and relationships, such variability is removed and the sole contact point, leading edge height, and bounce may be precisely established with respect to one another. The bounce is the angle between the lowest point on the sole and the leading edge directly in front of the lowest point. Further, the grind is the relief and contour that is machined from the ESR sole portion 210. FIG. 30 illustrates the ESR sole portion 210 before it has been machined, while FIGS. 31-36 illustrate embodiments in which various grinds have been machined from the ESR sole portion 210. FIGS. 31 and 36 illustrate embodiments in which the sole contact point has been machined, while the other figures illustrate alternative grinds.

The ESR face portion 230 may also facilitate control of the curvature of the face, as well as imparting variable face thickness to the striking face. In fact, some club head embodiments have a face insert that is attached to the club head, generally by welding, brazing, or adhesive, and in these embodiments the ESR face portion 230 allows the impartation of a variable face thickness, from the exterior of the club head, after the face insert is attached, as well as creation of a specific bulge and roll, either, or both, of which may also be varied by the selective removal of portions of the ESR face portion 230, which may be included on the face insert and the surrounding club head, from the exterior.

Further, all of the disclosure with respect to the ESR leading edge portion 220, applies equally to an ESR top edge portion located at the top of the face and an associated top edge radius, which is analogous to the leading edge radius. Such disclosure is generally applicable to embodiments having a curved face, i.e. having a bulge and/or roll, so that the top edge radius and the machining of the ESR top edge portion produces the desired top edge radius and finished curvature. In one such embodiment the machining of the ESR top edge portion allows precise variability of the top edge radius and/or curvature for customization of the appearance of the club when held at address by a golfer. For instance, machining of the ESR top edge portion facilitates the creation of a club head that appears to have an open or closed face angle even though it is not, or alternatively the appearance of a neutral face angle even though the actual face angle is closed or open. Thus, one skilled in the art will appreciate that the ESR top edge portion allows for incredible customization of the club head for a particular golfers desired appearance, which can greatly improve performance. Additionally, an ESR top edge portion and/or a ESR crown portion allows the selective machining of these areas to introduce aerodynamic features that are specifically tailored for the swing speed of the purchasing golfer. For instance, any of the aerodynamic features disclosed in U.S. patent application Ser. No. 14/330,205, which is incorporated by reference, may be machined into the ESR top edge portion and/or an ESR crown portion at locations, or orientations, that minimize the aerodynamic drag for a specific swing speed. Similarly, incorporation of the ESR crown portion may facilitate selective machining of the portion to achieve crown curvatures that reduce aerodynamic drag for a particular golfers swing speed, such as the curvatures disclosed in U.S. patent application Ser. Nos. 15/012,880, 15/002,471, and 15/334,790, which are incorporated by reference.

Additionally, the club head blank 250 has a back portion that may be formed with at least one head engager 300 used to hold the club head blank 250 during machining, as seen in FIGS. 24-27. A vice 400, having at least one cooperating vice engager 410, may be used to hold the club head bland 250 during machining. Further, the disclosed methods may further include the step of machining off the at least one head engager after the desired portions of the desired portions of the external sacrificial region 200 have been removed. In one embodiment the club head blank 250 also includes a secondary head engager 310, spaced apart from the first head engager 300, that cooperates with a secondary vice engager 420, spaced apart from the first vice engager 410. The engagers may be projections or indentations, or a combination thereof. In one embodiment the at least one head engager 300 projects from the back portion a projection distance of at least 3 mm and has a surface area of at least 35 $mm^2$. Additionally, in another embodiment the at least one head engager 300 is located at an elevation above a ground plane that is greater than a height of a center of gravity of the finished club head.

The relationships disclosed herein regarding the ESR removed mass removed from the various portions, the finished club head weight, the ESR thickness, the machining parameters, tools, and associated paths, all preferentially control the amount of heat imparted to the club head during machining, and thus the residual stresses on these surfaces. Further, machining of these contact surfaces may further remove areas plagued by residual stresses imparted to these surfaces during the casting or forging of the club head.

As used herein, the terms "wedge" and "wedge-type golf club" mean any iron-type golf club having a static loft angle that is greater than 45°. Any of the disclosure described herein in relation to a wedge or wedge-type golf club can be embodied in any of various wedges having different loft angles, such as a pitching wedge, gap wedge, sand wedge, lob wedge, flop wedge, and/or wedges having static loft angles of 46°, 48°, 50°, 52°, 54°, 56°, 58°, 60°, greater than 60°, and any other angles greater than 45°. The disclosed technologies and methods may also be applied to iron-type golf clubs having static loft angles of 45° or less, such as a 9-iron or lower-numbered irons, as well as hybrid or rescue clubs having flat or curved faces, fairway woods, drivers, and putters.

The components of the embodiments disclosed herein can be formed from any of various suitable metals, metal alloys, polymers, composites, or various combinations thereof. In addition to those noted elsewhere herein, examples of metals and metal alloys that can be used to form the components include, without limitation, carbon steels (e.g., 1020 or 8620 carbon steel), stainless steels (e.g., 304 or 410 stainless steel), PH (precipitation-hardenable) alloys (e.g., 17-4, C450, or C455 alloys), titanium alloys (e.g., 3-2.5, 6-4, SP700, 15-3-3-3, 10-2-3, or other alpha/near alpha, alpha-beta, and beta/near beta titanium alloys), aluminum/aluminum alloys (e.g., 3000 series alloys, 5000 series alloys, 6000 series alloys, such as 6061-T6, and 7000 series alloys, such as 7075), magnesium alloys, copper alloys, nickel alloys, and tungsten. Examples of composites that can be used to form the components include, without limitation, glass fiber reinforced polymers (GFRP), carbon fiber reinforced polymers (CFRP), metal matrix composites (MMC), ceramic matrix composites (CMC), and natural composites (e.g., wood composites). Examples of polymers that can be used to form the components include, without limitation, thermoplastic materials (e.g., polyethylene, polypropylene, polystyrene, acrylic, PVC, ABS, polycarbonate, polyurethane, polyphenylene oxide (PPO), polyphenylene sulfide (PPS), polyether block amides, nylon, and engineered thermoplastics), thermosetting materials (e.g., polyurethane, epoxy, and polyester), copolymers, and elastomers (e.g., natural or synthetic rubber, EPDM, and Teflon®).

Customer Directed Manufacturing

An advantage of forming a club head blank 250 having an external sacrificial region 200 is the ability to use create a number of custom finished club head configurations from a common club head blank 250. Such customer directed manufacturing may occur remotely, such as by a user configuring a desired combination of club head attributes online to produce a custom finished club head that is manufactured remotely in a plant, or locally, potentially in a retail establishment, via the use of a self-service kiosk 500. Self-service kiosk 500 embodiments will be described first.

The self-service kiosk 500 includes a kiosk control system 600, a user input system 700, a club attribute database 800 in communication with the kiosk control system 600, locally stored or remotely accessible, a plurality of club head blanks 250, and a machining system 1300, such as a CNC machine or other computer-controlled machining tool, and in some embodiments at least one robotic arm 1400 for moving components within the kiosk 500. In a simple embodiment the consumer selects a desired product using the user input system 700, and then selects at least one of a variety of predefined options available in the club attribute database 800 that are specifically filtered for the selected desired product. The predefined options include, but are not limited to, bounce, grind, leading edge height, leading edge offset, score-line pattern, and groove profile. Alternatively, the consumer may simply select a predefined club head that automatically sets all of the predefined options, which in some embodiments the consumer can then edit, such as by increasing or decreasing the attribute values within a fixed adjustment range that is set for the selected product. Further, in another embodiment the kiosk control system 600 may be programmed to present the consumer with a series of questions about the consumers skill level, typical playing conditions, and/or most common mis-hits. The consumer enters their responses with the user input system 700, the kiosk control system 600 analyzes the responses, and presents the consumer with recommended predefined club heads to select from, which then in some embodiments may present the consumer with the ability to adjust one, or more, attribute values within a fixed adjustment range that is set for the selected product. The kiosk control system 600 then transmits instructions to the machining system 1300, which then machines the club head and, in some embodiments dispenses the finished club head to the consumer, while in other embodiments the self-service kiosk 500 assembles a finished club head with a shaft and a grip to dispense to the consumer.

The predefined club heads within the club attribute database 800 may include manufacturer recommended club head configurations, and in some embodiments may include configurations that are attributed to a particular touring professional. For instance, the consumer may be able to select a Jason Day design so that all of the predefined options are substantially equal to those of the club heads used by Jason Day. Touring professionals are known to be very particular about the attributes of their club heads and generally require extensive custom contouring of the soles and leading edges. Thus, once the touring professional is satisfied with their custom contouring the club head may be scanned so that all the attributes may be configured for the club head blank 250 and stored in the Jason Day predefined club head within the club attribute database 800. In an even further embodiment predefined club heads within the club attribute database 800 may include configurations that mimic attributes of popular past club head designs that have been scanned and configured for use with the club head blank 250 to closely replicate attributes such as bounce, leading edge height, sole contact point, and/or grind of the past, often out of production, club head.

Further, the self-service kiosk 500 may include a data acquisition system 900 so that the consumer may bring a preferred existing club head to the kiosk 500 to have attributes mimicked into a new finished club head. For instance, the data acquisition system 900 may include a lie angle measurement system 910, a swing weight measurement system 920, a contour acquisition system 930, and/or a mass property acquisition system 940. In this embodiment the kiosk control system 600 may prompt the user to hold the preferred existing club as if they are addressing a golf ball. The lie angle measurement system 910 would then, optically or mechanically, capture the individual customers target lie angle. The contour acquisition system 930 would then capture a 3-D image of the club head in a target orientation. Further, the kiosk control system 600 may then prompt the consumer to position the preferred existing club head on the swing weight measurement system 920 and record a target swing weight; or alternatively the kiosk 500 may simply receive the preferred existing golf club and automatically perform the necessary analysis.

The 3-D image may then be transferred to a contour transformation module, resident either locally in the kiosk control system 600 or remotely on a manufacturer's computer system. The contour transformation module would then analyze the 3-D image, determine how to best fit the attributes of the sole and leading edge onto the club head blank 250, and create a model for a mimicked club head. In one embodiment the contour transformation module identifies the location of the ground contact point, in the customers target lie angle, with respect to another attribute of the club head, which may be, but is not limited to, the midpoint of the lowest scoreline, or the intersection of the shaft axis with the ground plane. Similarly, the contour transformation module may further identify the leading edge height profile throughout the length of the sole, as well as how the sole is shaped as it moves away from the ground contact point. Since the length and width of the club head blank 250 will be different than that of the preferred existing club head, the contour transformation module will then determine how to best mimic the sole and leading edge attributes of the 3-D image on the club head blank 250. Further, in some embodiments the contour transformation module may create multiple models that the consumer may then select from. For instance one model may be based upon locating the ground contact point with respect to the center of the face, while another model may be based upon a ground contact point with respect to the shaft axis. Similarly, the kiosk control system 600 may prompt the consumer to indicate which attribute of the preferred existing club head should drive the contour transformation module, such as, but not limited to, the ground contact point, the bounce, the leading edge profile, the leading edge height profile, and/or the grind. In fact, in one embodiment the kiosk control system 600 prompts the consumer to rank several of these attributes in order of importance, which the consumer enters via the user input system 700, and which is fed to the contour transformation module to influence the creation of the model, which is then ultimately transferred to the machining system 1300, and in some embodiments may be transferred to a remote club attribute library 1200 that collects data associated with mimicked club heads.

The swing weight measurement system 920 may supply data to a headweight transformation module, resident either locally in the kiosk control system 600 or remotely on a manufacturer's computer system, which is also in communication with the contour transformation module. The swing weight measurement system 920 measures and transmits the swingweight of the preferred existing club to the kiosk control system 600. The length of the preferred existing club may be acquired by the swing weight measurement system 920, or another aspect of the kiosk 500, such as by an image. Regardless, the headweight transformation module utilizes the measured swingweight and club length, and in some embodiments the desired shaft and grip that the consumer has selected for the new golf club, to determine the target head weight of the finished club head. Just as with the other design attributes that, in some embodiments, the consumer has prioritized in significance for the new club head design, the head weight may be another attribute for consumer prioritization. Either the contour transformation module or the headweight transformation module may then determine if additional mass must be removed from, or added to, the club head, such as, but not limited to, the a sole portion void 21.

In further embodiments the kiosk 500 includes a plurality of shafts, grips, ferrules, grip tape, solvent, epoxy, shaft cutting, deburring, and roughening equipment, and application equipment such that the robotic arm(s) 1400 may assemble a complete golf club.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically coupled or linked and does not exclude the presence of intermediate elements between the coupled items absent specific contrary language.

In view of the many possible embodiments to which the principles of this disclosure may be applied, it should be recognized that the illustrated embodiments are only preferred examples and should not be taken as limiting the scope of the inventions. Rather, the scope of the invention is defined by the following claims. We therefore claim all that comes within the scope and spirit of these claims. Whereas the invention has been described in connection with representative embodiments, it will be understood that the invention is not limited to those embodiments. On the contrary, the invention is intended to encompass all modifications, alternatives, and equivalents as may fall within the scope of the invention, as defined by the following claims.

We claim:

1. An iron-type golf club, comprising:
   a body including a hosel, a heel portion, a sole portion having a sole length, a toe portion, a top-line portion, a face portion having a loft angle of 17-60 degrees, and a leading edge joining the face portion and the sole portion and having a finished leading edge radius, wherein the sole portion extends rearwardly from the leading edge;
   the sole portion having a machined sole portion area of at least 900 mm$^2$;
   the leading edge having a machined leading edge portion area of at least 50 mm$^2$, wherein the machined leading edge portion area extends throughout at least 25% of the sole length and contacts a vertical midpoint demarcation plane;
   the face portion having a machined face portion area of at least 1800 mm$^2$;
   wherein the machined leading edge portion area is adjacent the machined sole portion area and has a plurality of continuous machining scallop lines extending from the machined sole portion area to the machined leading edge portion area;
   wherein the plurality of continuous machining scallop lines have a scallop height and a step-over distance between adjacent continuous machining scallop lines; and
   wherein the scallop height is 10-75% of the finished leading edge radius at the vertical midpoint demarcation plane, and the step-over distance is less than 150% of the finished leading edge radius at the vertical midpoint demarcation plane.

2. The iron-type golf club of claim 1, wherein the plurality of continuous machining scallop lines have a machine tool path defining a vertical tool path plane within a path angle from a vertical front-to-rear plane that is perpendicular to a vertical shaft axis plane, and the path angle is no more than 35 degrees.

3. The iron-type golf club of claim 2, wherein the machined leading edge portion area extends throughout at least 50% of the sole length, the scallop height is less than 70% of the finished leading edge radius at the vertical midpoint demarcation plane, and the step-over distance is less than the finished leading edge radius at the vertical midpoint demarcation plane.

4. The iron-type golf club of claim 3, wherein the path angle is no more than 25 degrees.

5. The iron-type golf club of claim 3, wherein the machined leading edge portion area extends throughout at least 75% of the sole length, the scallop height is less than 50% of the finished leading edge radius at the vertical midpoint demarcation plane, and the step-over distance is less than 75% of the finished leading edge radius at the vertical midpoint demarcation plane.

6. The iron-type golf club of claim 5, wherein the finished leading edge radius at the vertical midpoint demarcation plane is different than a finished leading edge radius at another point within the machined leading edge portion area.

7. The iron-type golf club of claim 6, wherein the finished leading edge radius at the vertical midpoint demarcation plane is at least 10% greater than the finished leading edge radius at another point within the machined leading edge portion area.

8. The iron-type golf club of claim 5, wherein the path angle is no more than 15 degrees.

9. The iron-type golf club of claim 5, wherein the scallop height is less than 35% of the finished leading edge radius at the vertical midpoint demarcation plane, the finished leading edge radius at the vertical midpoint demarcation plane is 1.0-4.0 mm, and the machined leading edge portion area is at least 75 mm$^2$.

10. The iron-type golf club of claim 2, wherein the scallop height is less than 0.50 mm and the step-over distance is no more than 1.5 mm.

11. The iron-type golf club of claim 2, wherein the machine tool path varies along the machined leading edge portion area.

12. The iron-type golf club of claim 2, wherein the sole portion has a sole portion void having a void length that is at least 50% of the sole length.

13. The iron-type golf club of claim 12, wherein the sole portion void is at least partially filled with a void insert.

14. An iron-type golf club, comprising:
- a body including a hosel, a heel portion, a sole portion having a sole length, a toe portion, a top-line portion, a face portion having a loft angle of 17-60 degrees, and a leading edge joining the face portion and the sole portion and having a finished leading edge radius, wherein the sole portion extends rearwardly from the leading edge;
- the sole portion having a machined sole portion area of at least 900 mm$^2$;
- the face portion having a machined face portion area of at least 1800 mm$^2$;
- wherein the machined sole portion area has a plurality of continuous machining scallop lines extending from a rear of the sole portion toward the face portion and having a scallop height and a step-over distance between adjacent continuous machining scallop lines;
- wherein the scallop height is 10-75% of the finished leading edge radius at the vertical midpoint demarcation plane, and the step-over distance is less than 150% of the finished leading edge radius at the vertical midpoint demarcation plane;
- wherein the plurality of continuous machining scallop lines have a machine tool path defining a vertical tool path plane within a path angle from a vertical front-to-rear plane that is perpendicular to a vertical shaft axis plane, and the path angle is no more than 35 degrees; and
- wherein the machined sole portion area extends throughout at least 50% of the sole length.

15. The iron-type golf club of claim 14, wherein, the scallop height is less than 70% of the finished leading edge radius at the vertical midpoint demarcation plane, and the step-over distance is less than the finished leading edge radius at the vertical midpoint demarcation plane.

16. The iron-type golf club of claim 15, wherein the path angle is no more than 25 degrees, the machined sole portion area extends throughout at least 75% of the sole length, the scallop height is less than 50% of the finished leading edge radius at the vertical midpoint demarcation plane, and the step-over distance is less than 75% of the finished leading edge radius at the vertical midpoint demarcation plane.

17. The iron-type golf club of claim 16, wherein the finished leading edge radius at the vertical midpoint demarcation plane is at least 10% greater than a finished leading edge radius at another point within the machined sole portion area.

18. The iron-type golf club of claim 16, wherein the scallop height is less than 35% of the finished leading edge radius at the vertical midpoint demarcation plane, the finished leading edge radius at the vertical midpoint demarcation plane is 1.0-4.0 mm, and a machined leading edge portion area is at least 75 mm$^2$.

19. The iron-type golf club of claim 14, wherein the scallop height is less than 0.50 mm and the step-over distance is no more than 1.5 mm.

20. The iron-type golf club of claim 14, wherein the machine tool path varies along the machined sole portion area.

* * * * *